(12) United States Patent
Koseoglu et al.

(10) Patent No.: US 11,591,526 B1
(45) Date of Patent: Feb. 28, 2023

(54) METHODS OF OPERATING FLUID CATALYTIC CRACKING PROCESSES TO INCREASE COKE PRODUCTION

(71) Applicant: Saudi Arabian Oil Company, Dhahran (SA)

(72) Inventors: Omer Refa Koseoglu, Dhahran (SA); Robert Peter Hodgkins, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/588,600

(22) Filed: Jan. 31, 2022

(51) Int. Cl.
*C10G 11/18* (2006.01)
*C10G 69/04* (2006.01)
(Continued)

(52) U.S. Cl.
CPC .............. *C10G 11/182* (2013.01); *B01D 3/14* (2013.01); *B01J 8/0025* (2013.01); *B01J 8/12* (2013.01);
(Continued)

(58) Field of Classification Search
CPC ...... C10G 11/182; C10G 63/04; C10G 69/04; C10G 2300/1044; C10G 2300/202;
(Continued)

(56) References Cited

U.S. PATENT DOCUMENTS 2,301,391 A 11/1942 Frey
2,373,501 A 4/1945 Merlin
(Continued)

FOREIGN PATENT DOCUMENTS

CA 1137118 A1 12/1982
CA 1168647 A1 6/1984
(Continued)

OTHER PUBLICATIONS

Chareonpanich et al., "Hydrocracking of Aromatic Hydrocarbons over USY-Zeolite", Energy & Fuels, vol. 10, pp. 927-931, 1996.
(Continued)

*Primary Examiner* — Randy Boyer
*Assistant Examiner* — Juan C Valencia
(74) *Attorney, Agent, or Firm* — Dinsmore & Shohl LLP

(57) ABSTRACT

A process for upgrading a hydrocarbon feed includes passing the hydrocarbon feed and an aromatic bottoms stream to an FCC unit including an FCC reactor and a catalyst regenerator. The hydrocarbon feed is hydrogen-rich having at least 12 wt. % hydrogen, and the aromatic bottoms stream is a bottoms stream produced from an aromatics recovery complex for processing reformate from naphtha reforming. The hydrocarbon feed and aromatic bottoms stream are cracked over the FCC catalysts to produce an effluent and spent FCC catalysts having coke deposits. The spent FCC catalyst is regenerated through combustion of the coke deposits. The hydrogen-rich hydrocarbon feed does not produce enough coke to satisfy the heat demand of the FCC reactor. Cracking the aromatic bottoms stream increases the amount of coke so that combustion of the additional coke during regeneration produces additional heat to satisfy the heat demand of the FCC reactor.

20 Claims, 6 Drawing Sheets

(51) Int. Cl.

| | | |
|---|---|---|
| *B01J 8/12* | (2006.01) | |
| *B01J 8/18* | (2006.01) | |
| *B01J 8/00* | (2006.01) | |
| *C10B 55/00* | (2006.01) | |
| *B01D 3/14* | (2006.01) | |
| *C10G 63/04* | (2006.01) | |

(52) U.S. Cl.
  CPC .......... *B01J 8/1818* (2013.01); *B01J 8/1845* (2013.01); *C10B 55/00* (2013.01); *C10G 63/04* (2013.01); *C10G 69/04* (2013.01); *C10G 2300/1044* (2013.01); *C10G 2300/202* (2013.01); *C10G 2300/301* (2013.01); *C10G 2300/305* (2013.01); *C10G 2300/307* (2013.01); *C10G 2300/308* (2013.01); *C10G 2400/02* (2013.01)

(58) Field of Classification Search
  CPC ........ C10G 2300/301; C10G 2300/305; C10G 2300/307; C10G 2300/308; C10G 2400/02; B01D 3/14; B01J 8/0025; B01J 8/12; B01J 8/1818; B01J 8/1845; C10B 55/00
  See application file for complete search history.

(56) References Cited

U.S. PATENT DOCUMENTS

| | | | |
|---|---|---|---|
| 2,389,713 A | 11/1945 | Atwell | |
| 2,836,632 A | 5/1958 | Fetterly | |
| 2,881,226 A | 4/1959 | Wadsworth | |
| 2,885,452 A | 5/1959 | Schmerling | |
| 2,954,413 A | 9/1960 | Kroeper et al. | |
| 3,053,760 A | 9/1962 | Henke et al. | |
| 3,062,903 A | 11/1962 | Odioso et al. | |
| 3,067,128 A | 12/1962 | Kimberlin, Jr. et al. | |
| 3,075,022 A | 1/1963 | Gammon et al. | |
| 3,116,345 A | 12/1963 | Slaymaker | |
| 3,159,565 A | 12/1964 | Kimberlin, Jr. et al. | |
| 3,172,842 A | 3/1965 | Patterson | |
| 3,197,518 A | 7/1965 | Chapman et al. | |
| 3,204,007 A | 8/1965 | Mukai et al. | |
| 3,252,888 A | 5/1966 | Langer, Jr. et al. | |
| 3,373,217 A | 3/1968 | Engelbrecht et al. | |
| 3,435,084 A | 3/1969 | Cabbage et al. | |
| 3,441,625 A | 4/1969 | Bargeron et al. | |
| 3,557,234 A | 1/1971 | Henry et al. | |
| 3,557,235 A | 1/1971 | Henry et al. | |
| 3,591,651 A | 7/1971 | Carr et al. | |
| 3,595,933 A | 7/1971 | Feldman et al. | |
| 3,617,494 A | 11/1971 | Montgomery | |
| 3,624,172 A | 11/1971 | Adams | |
| 3,625,879 A | 12/1971 | Horne et al. | |
| 3,649,520 A | 3/1972 | Graven | |
| 3,702,292 A | 11/1972 | Burich | |
| 3,723,256 A | 3/1973 | Thompson | |
| 3,795,608 A | 3/1974 | Fujiyama et al. | |
| 3,836,344 A | 9/1974 | Krawitz et al. | |
| 3,933,619 A | 1/1976 | Kozlowski | |
| 3,939,221 A | 2/1976 | Pearce | |
| 4,022,681 A | 5/1977 | Sheng et al. | |
| 4,066,531 A | 1/1978 | Owen et al. | |
| 4,070,408 A | 1/1978 | Vickers | |
| 4,078,990 A | 3/1978 | Brennan et al. | |
| 4,192,961 A | 3/1980 | Gankin et al. | |
| 4,203,826 A | 5/1980 | Mayes | |
| 4,211,886 A | 7/1980 | Morrison et al. | |
| 4,222,854 A | 9/1980 | Vorhis, Jr. et al. | |
| 4,242,531 A | 12/1980 | Carter | |
| 4,300,008 A | 11/1981 | Mccaulay | |
| 4,324,935 A | 4/1982 | Wernicke et al. | |
| 4,352,370 A | 10/1982 | Childress | |
| 4,382,851 A | 5/1983 | Angevine et al. | |
| 4,484,016 A | 11/1984 | Maschmeyer et al. | |
| 4,538,018 A | 8/1985 | Carter | |
| 4,645,585 A | 2/1987 | White | |
| 4,747,933 A | 5/1988 | Hibbs | |
| 4,923,589 A | 5/1990 | Dalson | |
| 5,004,853 A | 4/1991 | Barger et al. | |
| 5,149,894 A | 9/1992 | Holtermann et al. | |
| 5,189,233 A | 2/1993 | Larkin et al. | |
| 5,210,333 A | 5/1993 | Bellows et al. | |
| 5,286,371 A | 2/1994 | Goval et al. | |
| 5,294,334 A | 3/1994 | Kaul et al. | |
| 5,318,694 A | 6/1994 | Maher et al. | |
| 5,382,734 A | 1/1995 | Sardar et al. | |
| 5,773,670 A | 6/1998 | Gildert et al. | |
| 5,830,345 A | 11/1998 | Lee et al. | |
| 5,856,602 A | 1/1999 | Gildert et al. | |
| 5,871,618 A | 2/1999 | Lee et al. | |
| 5,877,385 A | 3/1999 | Lee et al. | |
| 6,187,980 B1 | 2/2001 | Gildert | |
| 6,187,987 B1 | 2/2001 | Chin et al. | |
| 6,281,398 B1 | 8/2001 | Belloir et al. | |
| 6,375,802 B1 | 4/2002 | Gentry et al. | |
| 6,398,947 B2 | 6/2002 | Beck et al. | |
| 6,448,436 B1 | 9/2002 | Murray et al. | |
| 6,565,742 B1 | 5/2003 | Gentry et al. | |
| 6,616,831 B1 | 9/2003 | Gentry et al. | |
| 6,787,025 B2 | 9/2004 | Mukherjee et al. | |
| 6,793,804 B1 | 9/2004 | Lindsay et al. | |
| 6,958,425 B1 | 10/2005 | Bogdan et al. | |
| 7,091,390 B2 | 8/2006 | Jan et al. | |
| 7,507,325 B2 | 3/2009 | Gueret et al. | |
| 7,638,667 B2 | 12/2009 | Jan et al. | |
| 7,687,423 B2 | 3/2010 | Moscoso et al. | |
| 7,723,554 B2 | 5/2010 | Area et al. | |
| 7,745,678 B2 | 6/2010 | Jan et al. | |
| 7,880,045 B2 | 2/2011 | Area et al. | |
| 7,964,763 B2 | 6/2011 | Dixon et al. | |
| 8,168,844 B2 | 5/2012 | Area et al. | |
| 8,539,397 B2 | 9/2013 | Sudhakar et al. | |
| 8,927,800 B2 | 1/2015 | Mahieux et al. | |
| 8,932,451 B2 | 1/2015 | Strauss et al. | |
| 8,975,462 B2 | 3/2015 | Kim et al. | |
| 9,090,521 B2 | 7/2015 | Al-Haji | |
| 9,109,169 B2 | 8/2015 | Al-Therwi et al. | |
| 9,145,522 B2 | 9/2015 | Negiz et al. | |
| 9,221,036 B2 | 12/2015 | Koseoglu et al. | |
| 9,221,729 B1 | 12/2015 | Lee | |
| 9,283,553 B2 | 3/2016 | Oh et al. | |
| 9,328,299 B2 | 5/2016 | Funk et al. | |
| 9,382,173 B2 | 7/2016 | Kanagawa et al. | |
| 9,650,579 B2 * | 5/2017 | Fanget .................. C10G 11/18 |
| 9,862,898 B2 | 1/2018 | Ward et al. | |
| 9,909,075 B2 | 3/2018 | Klein et al. | |
| 10,047,299 B2 | 8/2018 | Rubin-Pitel et al. | |
| 10,053,401 B1 | 8/2018 | Beadle et al. | |
| 10,081,009 B2 | 9/2018 | Koseoglu et al. | |
| 10,093,873 B2 | 10/2018 | Koseoglu et al. | |
| 10,357,761 B2 | 7/2019 | Koseoglu et al. | |
| 10,968,396 B1 | 4/2021 | Koseoglu et al. | |
| 11,248,173 B2 | 2/2022 | Koseoglu et al. | |
| 2001/0001448 A1 | 5/2001 | Kapoor et al. | |
| 2010/0230324 A1 * | 9/2010 | Al-Alloush ............ C10G 11/18 208/82 |
| 2013/0144097 A1 | 6/2013 | Bender et al. | |
| 2013/0240406 A1 | 9/2013 | Sadler et al. | |
| 2013/0345486 A1 | 12/2013 | Noll et al. | |
| 2015/0166435 A1 | 6/2015 | Serban et al. | |
| 2015/0251973 A1 | 9/2015 | Tinger et al. | |
| 2015/0284644 A1 | 10/2015 | Fanget et al. | |
| 2015/0299069 A1 | 10/2015 | Azam et al. | |
| 2015/0299086 A1 | 10/2015 | Farha et al. | |
| 2016/0045841 A1 | 2/2016 | Kaplan et al. | |
| 2017/0009156 A1 | 1/2017 | Pelaez | |
| 2017/0107430 A1 * | 4/2017 | Koseoglu ............. C10G 51/026 |
| 2018/0066197 A1 | 3/2018 | Koseoglu et al. | |

FOREIGN PATENT DOCUMENTS

| | | |
|---|---|---|
| CA | 2356632 A1 | 6/2000 |
| CN | 101376823 A | 3/2009 |

(56) References Cited

FOREIGN PATENT DOCUMENTS

| CN | 102037102 A | 4/2011 |
|---|---|---|
| EP | 200654 A1 | 11/1986 |
| FR | 2768724 A1 | 3/1999 |
| GB | 1279218 A | 6/1972 |
| GB | 1404776 A | 9/1975 |
| GB | 2034351 A | 6/1980 |
| WO | 9617039 A1 | 6/1996 |
| WO | 9923192 A1 | 5/1999 |

OTHER PUBLICATIONS

Haiyan et al., "A Scenario-based clean gasoline production strategy for China National Petroleum Corporation", Pet. Sci., vol. 5, pp. 285-294, 2008.

Kuo et al., "Application of a Mathematic Programming Model for Integrated Planning and Scheduling of Petroleum Supply Networks", Ind. Eng. Chem. Res., vol. 47, pp. 1935-1954, 2008.

Laredo et al., "Light Cycle Oil Upgrading to Benzene, Toluene, and Xylenes by Hydrocracking: Studies Using Model Mixtures", I&EC Research, vol. 56, pp. 10939-10948, 2017.

Lococo et al., "Multidimensional Gas Chromatographic Determination of Paraffins, Olefins and Aromatics in Naphthas", Annali di Chimica, vol. 96, pp. 553-560, 2006.

Smith et al., "Ethylene Dimerization over Supported Titanium Alkoxides", Journal of Catalysis, vol. 105, pp. 187-198, 1987.

Smolin et al., "Preparation of Substituted Styrenes by Cracking of Diarylethanes", Industrial & Engineering Chemistry Product Research and Development, vol. 3, No. 1, pp. 16-19, 1964.

Vahteristo, "Kinetic Modeling of Mechanisms of Industrially Important Organic Reactions in Gas and Liquid Phase" Lappeenranta University of Technology (Acta Universitatis Lappeenrantaensis 402), 2010.

Viswanadham et al., "Reformulation of FCC gasoline", Fuel, vol. 86, pp. 1290-1297, 2007.

Wei et al., "FeS2-Catalyzed Hydrocracking of a, w-Diarylalkanes", Bull. Chem. Soc. Jpn., vol. 65, No. 4, pp. 1114-1119, 1992.

International Search Report and Written Opinion pertaining to Application No. PCT/US2013/039191 dated Nov. 29, 2013.

International Search Report and Written Opinion pertaining to Application No. PCT/US2017/047842 dated Oct. 11, 2017.

International Search Report and Written Opinion pertaining to Application No. PCT/US2018/018471 dated Apr. 19, 2018.

International Search Report and Written Opinion pertaining to Application No. PCT/US2021/016275 dated May 12, 2021.

\* cited by examiner

METHODS OF OPERATING FLUID CATALYTIC CRACKING PROCESSES TO INCREASE COKE PRODUCTION

BACKGROUND

Field

The present disclosure generally relates to processes and systems for upgrading hydrocarbons, more specifically, systems and processes for upgrading hydrocarbons through fluidized catalytic cracking.

Technical Background

The fluid catalytic cracking (FCC) unit is one of the primary hydrocarbon conversion units in the modern petroleum refinery. During fluid catalytic cracking processes conducted in such FCC units, hydrocarbons are contacted with a solid catalyst in a fluidized state, which causes cracking of the hydrocarbons to produce one or more products or intermediate chemicals. The FCC unit may predominantly produce gasoline. However, other products, such as light hydrocarbon gases, C1-C4 compounds, and unconverted cycle oils may also be produced. When operated under high-severity FCC units, fluidized catalytic cracking of the hydrocarbons may also produce olefins.

Additional chemical products and intermediates are produced from naphtha streams through naphtha reforming processes. These naphtha reforming processes can produce chemical products and intermediates such as olefins and aromatic compounds, which are basic intermediates for a large portion of the petrochemical industry. In particular, the production of some valuable light olefins, such as ethylene, propene, and butenes, has attracted increased attention as pure olefin streams are considered the building blocks for polymer synthesis. Additionally, aromatic compounds such as benzene, toluene, ethylbenzene, and xylenes can be valuable intermediates for synthesizing polymers and other organic compounds as well as for fuel additives.

SUMMARY

FCC units generally include an FCC reactor, in which the cracking reactions are conducted, and a catalyst regenerator, which is used to regenerate the FCC catalyst. During the FCC process, hydrocarbons in a hydrocarbon feed are contacted with an FCC catalyst and catalytically cracked to produce one or more chemical products or intermediates. Additionally, coke deposits form on the FCC catalyst, and the coke deposits reduce the catalytic activity of the FCC catalyst. During regeneration, the coke deposits are removed from the FCC catalyst through combustion to at least partially or fully restore the catalytic activity of the FCC catalyst. Combustion of the coke deposits also produces heat, which heats the FCC catalyst back to a temperature greater than or equal to the reaction temperature in the FCC reactor. The cracking reactions in the FCC reactor are endothermic. Therefore, combustion of the coke deposits during catalyst regeneration provides the heat necessary to propagate the catalytic cracking reactions in the FCC reactor.

In some instances, the hydrocarbon feed to the FCC unit may be a hydrogen-rich hydrocarbon feed, such as a hydrocarbon feed having greater than or equal to 12 weight percent (wt. %) hydrogen. If the hydrocarbon feed to the FCC unit is a hydrogen-rich hydrocarbon stream, then the catalytic conversion of the hydrogen-rich hydrocarbon stream in the FCC reactor may produce less coke compared to feedstocks having less than 12 wt. % hydrogen. In some instances, the amount of coke produced in the FCC reactor is not sufficient to generate the necessary heat to drive the cracking reactions, and the FCC unit becomes heat deficient. Therefore, ongoing needs exist for methods of operating FCC units to ensure that the heat requirements of the FCC unit are satisfied for hydrogen-rich hydrocarbon feeds and for hydrocarbon feeds with changing compositions, such as changing amounts of hydrogen.

Additionally, ongoing needs exist for finding beneficial uses for the aromatic bottoms stream recovered from naphtha reforming processes. The aromatic bottoms stream is a stream generated from the process for upgrading naphtha feeds through naphtha reforming processes. During naphtha reforming, a naphtha stream is reformed in a naphtha reforming unit to produce a reformate, which includes greater value aromatic compounds, such as but not limited to benzene, toluene, xylenes, and ethylbenzene. The reformate may also include lesser value $C_{9+}$ aromatic compounds. The $C_{9+}$ aromatic compounds can include mono-aromatic or poly-aromatic compounds. The reformate may be further processed in the aromatics recovery complex (ARC), which separates and processes the reformate to produce one or more aromatic product streams (benzene, toluene, xylenes, ethylbenzene, or other $C_6$-$C_8$ aromatics), a gasoline pool stream, and the aromatic bottoms stream. The aromatic bottoms stream can comprise $C_{9+}$ aromatic compounds, $C_{10+}$ aromatic compounds, or $C_{11+}$ aromatic compounds that have generally been considered waste products of hydrocarbon refineries.

The present disclosure is directed to systems and processes for operating FCC units to adjust coke formation in the FCC reactor to ensure that the heat requirements of the FCC reactor are satisfied. The processes of the present disclosure include passing at least a portion of an aromatic bottoms stream from the aromatics recovery complex (ARC) from naphtha reforming processes to the FCC reactor of the FCC unit. The aromatic bottoms stream may be contacted with the FCC catalyst and cracked in the FCC reactor to produce increased amounts of coke, which can increase the heat generated in the catalyst regenerator. The processes of the present disclosure may further include adjusting the flow rate of the aromatic bottoms stream to the FCC unit depending on the one or more operating parameters of the FCC unit, such as heat generated in the catalyst regenerator, temperature of the regenerated FCC catalyst, composition of the hydrocarbon feed, or other operating parameter. In embodiments, the aromatic bottoms stream may be separated in an atmospheric distillation unit (ADU) upstream of the FCC unit, and an ADU bottoms stream may be passed from the ADU to the FCC unit.

According to one or more aspects of the present disclosure, a process for upgrading a hydrocarbon feed can include passing the hydrocarbon feed and an aromatic bottoms stream to a fluidized catalytic cracking (FCC) unit comprising an FCC reactor and a catalyst regenerator. The hydrocarbon feed can be a hydrogen-rich hydrocarbon feed comprising greater than or equal to 12 wt. % hydrogen on an elemental basis, and the aromatic bottoms stream can be a bottoms stream produced from an aromatics recovery complex. The process further can include contacting the hydrocarbon feed and the aromatic bottoms stream with an FCC catalyst, an FCC cracking additive, or both at a reaction temperature of from 480° C. to 650° C. in the FCC reactor, where the contacting produces a spent FCC catalyst and an FCC effluent comprising one or more products. The spent FCC catalyst can comprise coke deposits produced through reaction of the hydrocarbon feed and aromatic bottoms stream in the FCC reactor. The process further can include separating the FCC effluent from the spent FCC catalyst and regenerating the spent FCC catalyst in the catalyst regenerator. Regenerating the spent FCC catalyst can comprise combusting the coke deposits on the spent FCC catalyst to produce a regenerated FCC catalyst. Catalytic cracking the aromatic bottoms stream in the FCC reactor can increase the coke deposits to an amount that, when combusted, heats the regenerated FCC catalyst to a temperature greater than or equal to the reaction temperature of the FCC reactor.

According to another aspect of the present disclosure, a system for upgrading a hydrocarbon feed can include a hydrocarbon feed comprising greater than or equal to 12 weight percent hydrogen based on the total weight of the hydrocarbon feed; an aromatic bottoms stream from an aromatics recovery complex, the aromatic bottoms stream comprising at least 50 weight percent $C_{9+}$ aromatic compounds based on the total weight of the aromatic bottoms stream; and a fluidized catalytic cracking (FCC) unit comprising at least one FCC reactor and a catalyst regenerator. The FCC unit further includes an FCC catalyst, an FCC catalyst additive, or both circulated through the FCC unit. The at least one FCC reactor can be in fluid communication with the hydrocarbon feed to pass the hydrocarbon feed to the FCC reactor. The at least one FCC reactor is operable to contact the hydrocarbon feed and the aromatic bottoms stream with the FCC catalyst, the FCC catalyst additive, or both at operating conditions that cause at least a portion of hydrocarbons in the hydrocarbon feed and the aromatic bottoms stream to undergo catalytic cracking reactions to produce an FCC effluent and a spent FCC catalyst comprising coke deposits.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
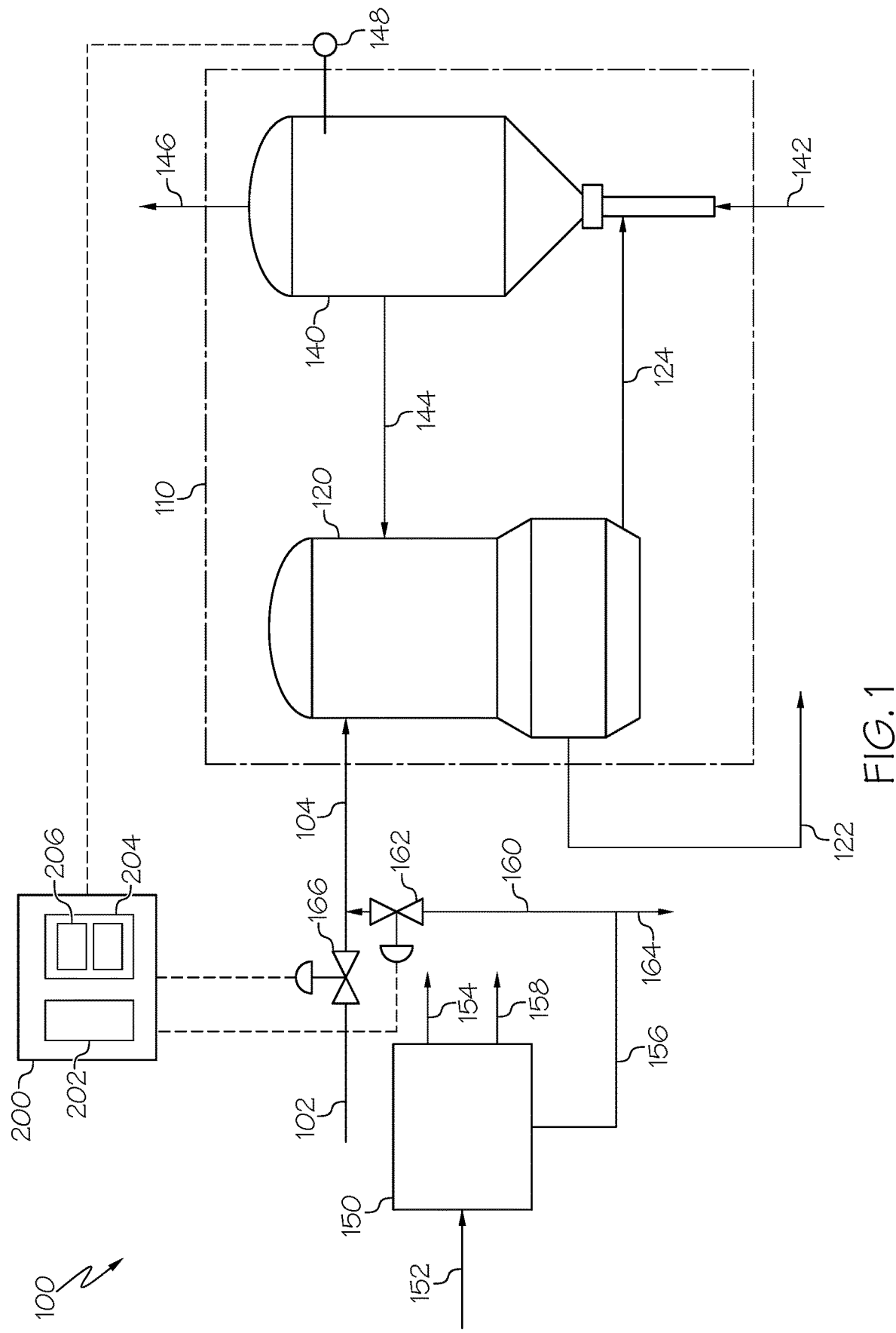
FIG. 1 schematically depicts a generalized flow diagram of one system for upgrading a hydrocarbon feed, according to one or more embodiments shown and described in this disclosure.

For the purpose of describing the simplified schematic illustrations and descriptions of FIGS. 1-6, the numerous valves, temperature sensors, electronic controllers, and the like that may be employed and well known to those of ordinary skill in the art of certain chemical processing operations may not be included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-6. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

DETAILED DESCRIPTION

The present disclosure is directed to systems and processes for upgrading hydrocarbon feeds through fluidized catalytic cracking (FCC), in particular, systems and methods for increasing coke generation in an FCC unit to satisfy the heat requirements of the FCC unit. Referring now to FIG. 1, one embodiment of a system 100 of the present disclosure for upgrading a hydrocarbon feed through fluidized catalytic cracking is schematically depicted. The system 100 comprises a Fluidized Catalytic Cracking (FCC) unit 110 that includes an FCC reactor 120 and a catalyst regenerator 140. The FCC unit 110 may be operable to contact the hydrocarbon feed 102 with an FCC catalyst under reaction condition sufficient to convert at least a portion of the hydrocarbons in the hydrocarbon feed 102 to greater value chemical products or intermediates. The system 100 may further include an aromatics recovery unit (ARC) 150 operable to process a reformate 152 from a naphtha reforming unit to produce at least one aromatic product stream 154 and an aromatic bottoms stream 156. At least a portion of the aromatic bottoms stream 156 is passed to the FCC unit 110 along with the hydrocarbon feed 102. Passing the aromatic bottoms stream 156 to the FCC unit 110 increases the production of coke in the FCC reactor 120, thereby increasing the heat generated in the catalyst regenerator 140 to satisfy the heat requirements of the FCC reaction. The system 100 may further include an aromatic bottoms control valve 162 and a control system 200 operable to control the flow rate of the aromatic bottoms stream 156 to the FCC unit 110.

The system 100 may be used in the processes for upgrading the hydrocarbon feed 102 through fluidized catalytic cracking of the present disclosure. The processes include passing the hydrocarbon feed 102 and the aromatic bottoms stream 156 to the FCC unit 110. The hydrocarbon feed 102 may be a hydrogen-rich hydrocarbon feed comprising greater than or equal to 12 wt. % hydrogen on an elemental basis, and the aromatic bottoms stream 156 is a bottoms stream produced from the ARC 150. The processes include contacting the hydrocarbon feed 102 and the aromatic bottoms stream 156 with the FCC catalyst at a reaction temperature of from 480° C. to 650° C. in the FCC reactor 120. The contacting produces an FCC effluent 122 and a spent FCC catalyst 124. The spent FCC catalyst 124 comprises coke deposits produced through reaction of the hydrocarbon feed 102 and aromatic bottoms stream 156. The process further includes separating the FCC effluent 122 from the spent FCC catalyst 124 and regenerating the spent FCC catalyst 124 in the catalyst regenerator 140. Regenerating the spent FCC catalyst 124 comprises combusting the coke deposits on the spent FCC catalyst 124 to produce a regenerated FCC catalyst 144. Catalytic cracking the aromatic bottoms stream 156 in the FCC reactor 120 increases the coke deposits to an amount sufficient to heat the regenerated FCC catalyst 144 to a temperature greater than or equal to the reaction temperature of the FCC reactor 120. The additional coke produced by passing the aromatic bottoms stream 156 to the FCC unit 110 increases the heat generated during catalyst regeneration to satisfy the heat requirements of the FCC reactions. Additionally, controlling the flow rate of the aromatic bottoms stream to the FCC unit 110 can enable control of the heat generation during catalyst regeneration to account for changing compositions of the hydrocarbon feed 102 to the FCC unit 110.

As used in this disclosure, a "catalyst" refers to any substance that increases the rate of a specific chemical reaction. Catalysts and catalyst components described in this disclosure may be utilized to promote various reactions, such as, but not limited to cracking, aromatic cracking, hydrodesulfurization, hydrodemetalization, hydrodenitrogenation, hydrodearomatization, hydrocracking, naphtha reforming, transalkylation, other reactions, or combinations of these.

As used in this disclosure, "cracking" refers to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality.

As used throughout the present disclosure, the term "light olefins" refers to one or more of ethylene, propylene, butenes, or combinations of these.

As used throughout the present disclosure, the term "butene" or "butenes" refers to one or more than one isomer of butene, such as one or more of 1-butene, trans-2-butene, cis-2-butene, isobutene, or mixtures of these isomers. As used throughout the present disclosure, the term "normal butenes" may refer to one or more than one of 1-butene, trans-2-butene, cis-2-butene, or mixtures of these isomers, and does not include isobutene. As used throughout the present disclosure, the term "2-butene" may refer to trans-2-butene, cis-2-butene, or a mixture of these two isomers.

As used throughout the present disclosure, the terms "xylene," "xylenes," or "mixed xylenes" refer to one or more than one isomer of xylene, such as meta-xylene, ortho-xylene, para-xylene, or mixtures of these.

As used throughout the present disclosure, the term "crude oil" or "whole crude oil" refers to crude oil received directly from an oil field or from a desalting unit without having any fraction separated by distillation.

As used throughout the present disclosure, the terms "upstream" and "downstream" refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined. Simply dividing a stream into two streams having the same composition is also not considered to comprise an intervening system that changes the composition of the stream.

As used in this disclosure, a "separation unit" refers to any separation device that at least partially separates one or more chemicals that are mixed in a process stream from one another. For example, a separation unit may selectively separate differing chemical species from one another, forming one or more chemical fractions. Examples of separation units include, without limitation, distillation columns, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition. Further, in some separation processes, a "light fraction" and a "heavy fraction" may separately exit the separation unit. In general, the light fraction stream has a lesser boiling point than the heavy fraction stream. It should be additionally understood that where only one separation unit is depicted in a figure or described, two or more separation units may be employed to carry out the identical or substantially identical separation. For example, where a distillation column with multiple outlets is described, it is contemplated that several separators arranged in series may equally separate the feed stream and such embodiments are within the scope of the presently described embodiments.

As used in this disclosure, the term "effluent" refers to a stream that is passed out of a reactor, a reaction zone, or a separation unit following a particular reaction or separation. Generally, an effluent has a different composition than the stream that entered the separation unit, reactor, or reaction zone. It should be understood that passing an effluent from a first system unit to a second system unit can include passing all of or only a portion of that effluent from the first system unit to the second system unit. For example, passing the effluent from a first system unit to a second system unit can include configurations in which a slip stream (having the same composition) carries some of the effluent away, meaning that only a portion of the effluent enters the second system unit. The term "reaction effluent" may more particularly be used to refer to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

Referring now to FIG. 1, one embodiment of a system 100 for upgrading a hydrocarbon feed 102 is schematically depicted. The system 100 comprises a Fluidized Catalytic Cracking (FCC) unit 110 that includes an FCC reactor 120 and a catalyst regenerator 140. The FCC unit 110 may be operable to contact the hydrocarbon feed 102 with an FCC catalyst under reaction conditions sufficient to convert at least a portion of the hydrocarbons in the hydrocarbon feed 102 to greater value chemical products or intermediates. The system 100 may further include an aromatics recovery unit (ARC) 150 operable to process a reformate 152 from a naphtha reforming unit to produce at least one aromatic product stream 154 and an aromatic bottoms stream 156. At least a portion of the aromatic bottoms stream 156 is passed to the FCC unit 110 along with the hydrocarbon feed 102. Passing at least a portion of the aromatic bottoms stream 156 to the FCC unit 110 increases the production of coke deposits in the FCC reactor 120, thereby increasing the heat generated in the catalyst regenerator 140 to satisfy the heat requirements of the FCC reaction. The system 100 may further include an aromatic bottoms control valve 162 and a system controller 200 operable to control the flow rate of the aromatic bottoms stream 156 to the FCC unit 110.

Figure 2:
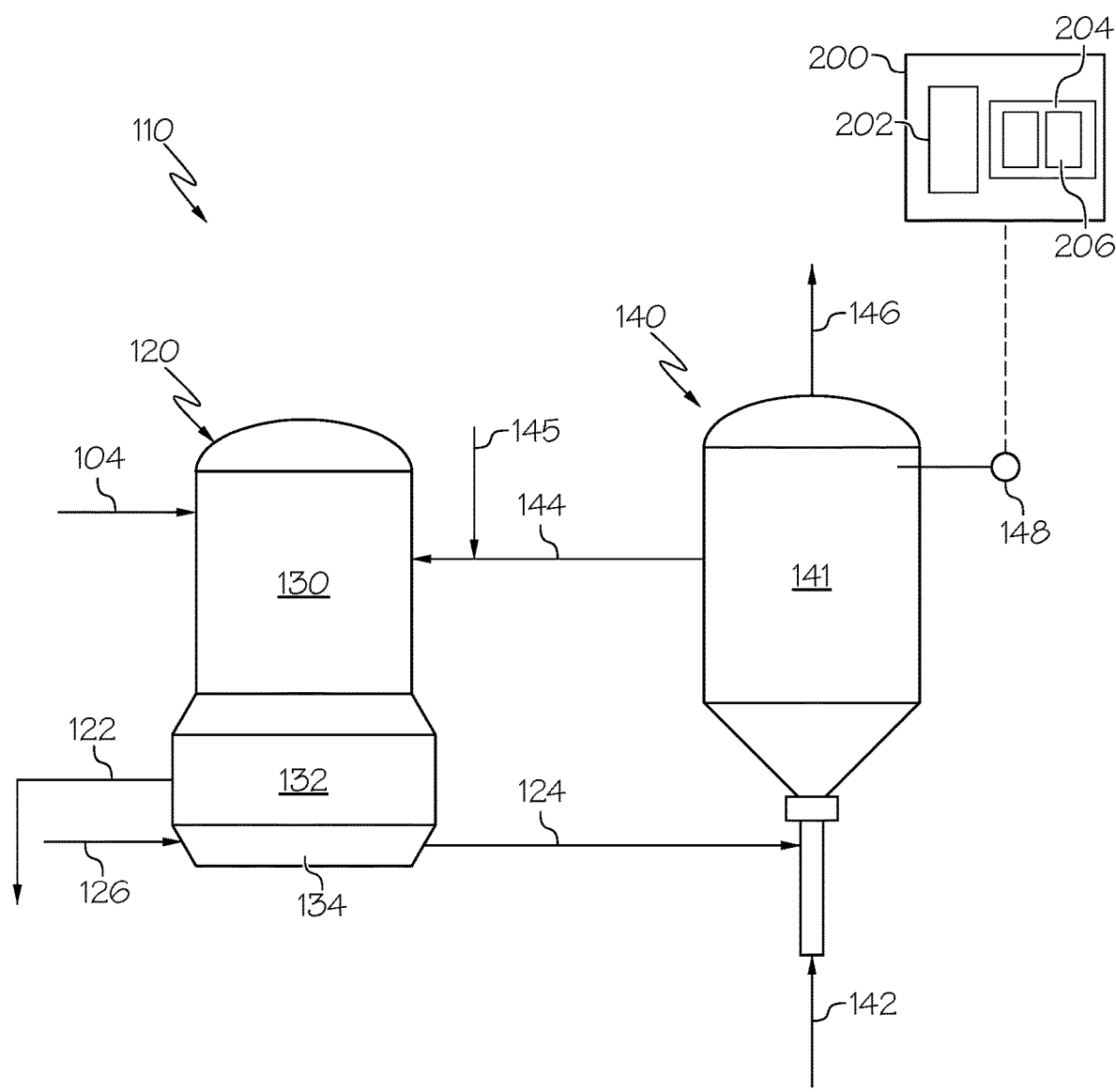
FIG. 2 schematically depicts a generalized flow diagram of an FCC downer unit for upgrading a hydrocarbon feed, according to one or more embodiments shown and described in this disclosure.
Figure 3:
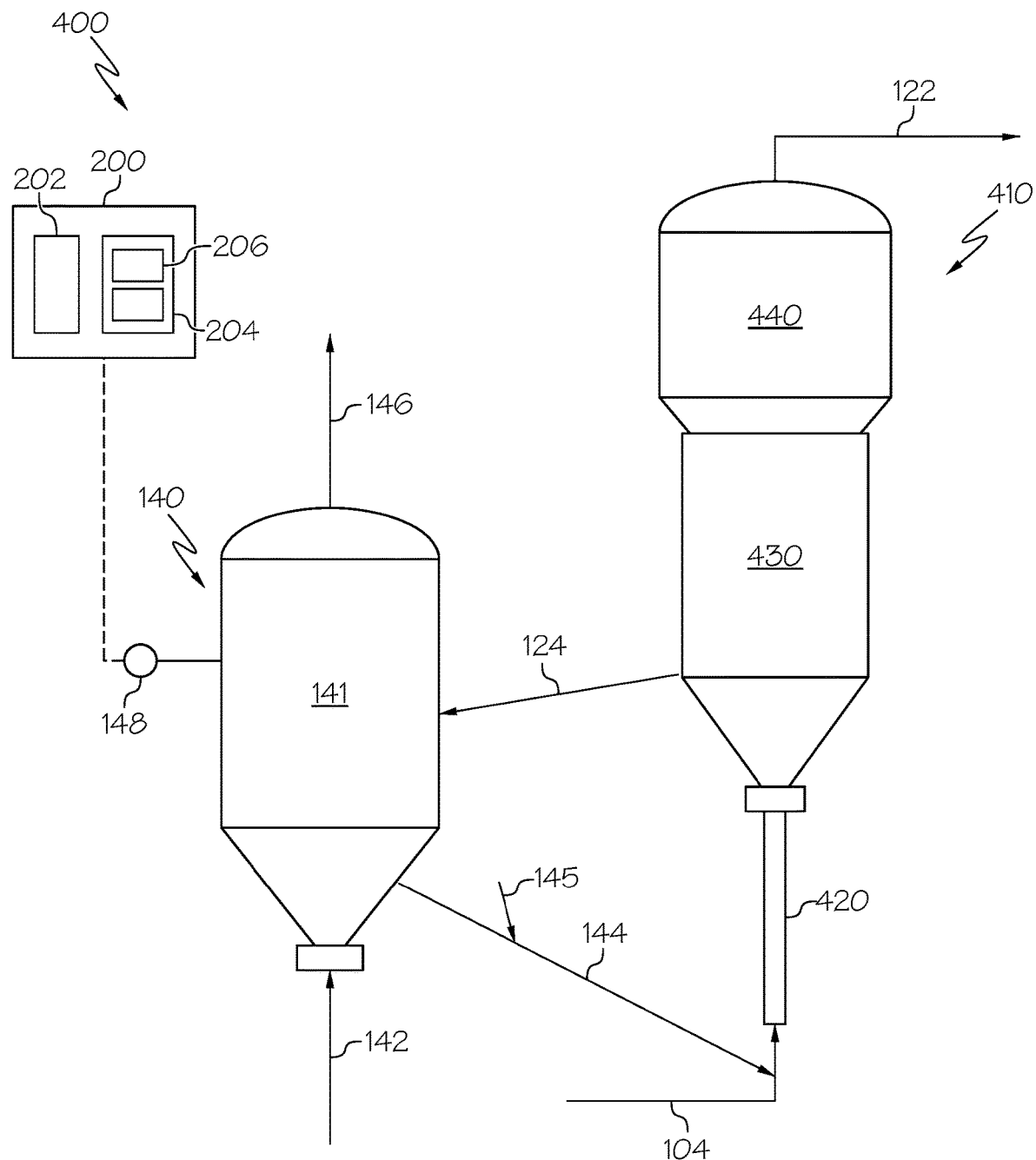
FIG. 3 schematically depicts a generalized flow diagram of an FCC riser unit for upgrading a hydrocarbon feed, according to one or more embodiments shown and described in this disclosure.

Referring again to FIG. 1, the FCC unit 110 comprises the FCC reactor 120 and the catalyst regenerator 140. The FCC unit 110 may be in fluid communication with a hydrocarbon feed source (not shown) so that the hydrocarbon feed 102 can be passed to the FCC unit 110. The FCC reactor 120 may be a riser reactor, a downer reactor, or combinations of these. The FCC reactor 120 may additionally include one or a plurality of FCC reactors in parallel or in series. Referring now to FIGS. 2 and 3, two embodiments of FCC units are schematically depicted. FIG. 2 schematically depicts FCC unit 110 from FIG. 1 in which the FCC reactor 120 is a downer reactor. FIG. 3 schematically depicts an alternative FCC unit 400 in which the FCC reactor is a riser reactor. The FCC units 110, 400 schematically depicted in FIGS. 2 and 3 are provided as two options for conducting fluidized catalytic cracking. It is understood that any other configuration for the FCC reactor may also be suitable without departing from the scope of the present disclosure.

Referring now to FIGS. 1 and 2, in embodiments, the FCC unit 110 includes at least one FCC reactor 120 that is a downer reactor and the catalyst regenerator 140. The FCC reactor 120 generally refers to the part of the FCC unit 110 in which the major process reaction takes place, such as the upgrading of the FCC feed 104 through contact with a cracking catalyst to produce an FCC effluent 122 comprising one or more greater value chemical products or intermediates. The greater value chemical products and intermediates can include, but are not limited to gasoline blending components, light hydrocarbon gases (C1-C4 hydrocarbon gases) and olefins. Olefins produced in the FCC unit 110 may include but are not limited to ethylene, propylene, mixed butenes, or other olefins. The FCC reactor 120 may include a reaction zone 130, a catalyst separation zone 132 downstream of the reaction zone 130, and a stripper zone 134 downstream of the separation zone 132. The FCC unit 110 may also include the catalyst regenerator 140 fluidly coupled to the FCC reactor 120 to pass spent FCC catalyst 124 from the FCC reactor 120 to the catalyst regenerator 140. In particular, the catalyst regenerator 140 may be fluidly coupled to the stripping zone 134 of the FCC reactor 120. The catalyst regenerator 140 may include at least one regeneration zone 141 for regenerating spent FCC catalyst 124 to produce regenerated FCC catalyst 144, which may be passed back to the FCC reactor 120. The FCC reactor 120 and catalyst regenerator 140 may form a continuous loop through which the FCC catalyst is continually circulated during operation.

Referring to FIG. 2, the FCC feed 104, which includes the hydrocarbon feed 102, the aromatic bottoms stream 156, or both, is introduced to the reaction zone 130 of the FCC reactor 120. An effective amount of regenerated FCC catalyst 144 from regeneration zone 141 may be conveyed to the top of the reaction zone 130. The regenerated FCC catalyst 144 may be heated in the catalyst regenerator 140 to a temperature greater than or equal to the reaction temperature in the FCC reactor 120. Heated fresh FCC catalyst 145 may also be passed to the reaction zone 130 or combined with the regenerated FCC catalyst 144 upstream of the reaction zone 130. The fresh FCC catalyst 145 may be heated to a temperature greater than or equal to the reaction temperature in the FCC reactor 120. When introduced, the fresh FCC catalyst 145 may be combined with the regenerated FCC catalyst 144 before passing the regenerated FCC catalyst to the FCC reactor 120.

The heated fresh FCC catalyst 145, regenerated FCC catalyst 144 from the regeneration zone 141, or both may be conveyed to the top of the reaction zone 130 through a conduit, which may be referred to as a transfer line or standpipe. In embodiments, the heated fresh FCC catalyst 145, regenerated FCC catalyst 144, or both may be transferred to a catalyst hopper (not shown) disposed near the top of the reaction zone 130. The flow of fresh FCC catalyst 145, regenerated FCC catalyst 144, or both be allowed to stabilize in order to be uniformly directed into reaction zone 130, such as a mix zone or feed injection portion of the reaction zone 130.

The FCC feed 104 may be injected into a mixing zone at a position proximate to the point of introduction of the fresh FCC catalyst 145, regenerated FCC catalyst 144, or both into reaction zone 130. The reaction vapors and FCC catalyst travel downward through the reaction zone 130 to the catalyst separation zone 132, which is disposed downstream of the reaction zone 130. The reaction vapors may include reaction products and unreacted hydrocarbons from the FCC feed 104. In the catalyst separation zone 132, the solid FCC catalyst particles are separated from the reaction vapors to produce an FCC effluent 122 and used FCC catalyst 124. The used FCC catalyst 124 may be passed through the stripping zone 134, which is disposed downstream of the catalyst separation zone 132.

In the stripping zone 134, a suitable stripping gas, such as steam, may be introduced through streamline 126. The stripping zone 134 may comprise a plurality of baffles or structured packing (not shown) over which downwardly flowing catalyst particles passes counter-currently to the stripping gas. The upwardly flowing stripping gas may strip or remove some additional hydrocarbons from the catalyst particle pores or between catalyst particles. The used FCC catalyst 124 may be passed from the stripping zone 134 to the catalyst regenerator 140.

The used FCC catalyst 124 may be transported by lift forces from an oxygen-containing gas 142 through a lift riser of the catalyst regenerator 140. The used FCC catalyst 124 may then be contacted with the oxygen-containing gas 142 and may undergo controlled combustion of any accumulated coke deposits on the used FCC catalyst 124 in the regeneration zone 141 to produce the regenerated FCC catalyst 144. Flue gasses 146 may be passed out of the catalyst regenerator 140. In the regeneration zone 141, the heat produced from combustion of the coke deposits may be transferred to the regenerated FCC catalyst 144, which may increase the temperature of the regenerated FCC catalyst 144 to a temperature required to provide heat to the catalytic reaction in the reaction zone 130, such as a temperature greater than or equal to the reaction temperature in the reaction zone 130. A standpipe may fluidly couple the regeneration zone 141 of the catalyst regenerator 140 to the upstream end of the reaction zone 130 to pass the regenerated FCC catalyst 144 to the reaction zone 130.

Referring now to FIG. 3, one embodiment of an FCC unit 400 comprising an FCC reactor 410 that is a riser reactor is schematically depicted. The FCC reactor 410 can include a riser 420, a reaction zone 430, and a catalyst separation zone 440. The reaction zone 430 may be downstream from the riser 420, and the catalyst separation zone 440 may be downstream of the reaction zone 430. The FCC unit 400 may also comprise the catalyst regenerator 140 for regenerating the used FCC catalyst 124.

For the FCC unit 400 of FIG. 3, the FCC feed 104, which may include the hydrocarbon feed 102, at least a portion of the aromatic bottoms stream 156, or both, may be introduced to the bottom of the riser 420. The FCC feed 104 may be combined with steam or other suitable lift gas at the bottom of the riser 420. The regenerated FCC catalyst 144, fresh FCC catalyst 145, or both is also passed to the bottom of the riser 420 through conduit or standpipe fluidly coupling the regeneration zone 141 to the inlet of the riser 420. The regenerated FCC catalyst 144, fresh FCC catalyst 145, or both and the FCC feed 104 are combined and mixed in the riser 420. The FCC feed 104 and the FCC catalyst (regenerated FCC catalyst 144, fresh FCC catalyst 145 or both) are then passed upwards through the riser 420 to the reaction zone 430. In the riser 420 and the reaction zone 430, the hydrocarbons from the FCC feed 104 may be contacted with the FCC catalyst at the reaction conditions. Contact of the hydrocarbons from the FCC feed 104 with the FCC catalyst at the reaction conditions may cause at least a portion of the hydrocarbons from the FCC feed 104 to undergo catalytic cracking reactions to form greater value chemical products or intermediates. The greater value chemical products and intermediates can include, but are not limited to gasoline blending components, light hydrocarbon gases (C1-C4 hydrocarbon gases) and olefins.

Referring again to FIG. 3, during the catalytic cracking reactions in the riser 420 and reaction zone 430, the FCC catalyst may become coked, which may result in reduced access to the active catalytic sites of the FCC catalyst particles. The reaction vapors, which comprises reaction products and unreacted hydrocarbons from the FCC feed 104, and the used FCC catalyst may be passed to the separation zone 440 disposed downstream of the reaction zone 430. Reaction products may be separated from the coked catalyst particles to produce the FCC effluent 122 and the used FCC catalyst 124. The FCC effluent 122 may be passed out of the FCC reactor 410. The used FCC catalyst 124 may be passed to the catalyst regenerator 140.

As previously discussed, in the regeneration zone 141 of the catalyst regenerator 140, the used FCC catalyst 124 comprising coke deposits may be contacted with an oxygen-containing gas 142 in the regeneration zone 141 of the catalyst regenerator 140. The regeneration zone 141 may be operated in a configuration under conditions that are known in FCC operations. For instance, the regeneration zone 141 may be operated as a fluidized bed to produce regenerated FCC catalyst 144 and a flue gas 146, which may include combustion products produced through combustion of the coke deposits. Combustion of the coke deposits in the regeneration zone 141 may heat the regenerated FCC catalyst 144 to a temperature greater than or equal to the reaction temperature in the reaction zone 430. The regenerated FCC catalyst 144 may be transferred from the regeneration zone 141 of the catalyst regenerator 140 to the riser 420 admixture with the FCC feed 104.

The FCC catalyst (regenerated FCC catalyst 144, fresh FCC catalyst 145, or both) in the FCC unit (FCC unit 110 or FCC unit 400) may include any conventional or yet to be developed FCC catalyst. The FCC catalyst can include a single FCC catalyst or a plurality of different FCC catalysts. The FCC catalyst be operable as a heat carrier and may provide heat transfer to the FCC feed 104 in the FCC reactor 120. The FCC catalyst may also have a plurality of catalytically active sites, such as acidic sites that promote the catalytic cracking of at least a portion of the hydrocarbons in the FCC feed 104. Suitable cracking catalysts may include but are not limited to natural or synthetic zeolites, such as Y zeolites, REY zeolites, USY zeolites, and RE-USY zeolites; clays, such as kaolin, montmorilonite, halloysite, and bentonite; inorganic porous oxides, such as alumina, silica, boria, chromia, magnesia, zirconia, titania and silica-alumina; or combinations of these. In embodiments, the FCC catalyst may also include one or more FCC catalyst additives, such as but not limited to suitable shape-selective zeolites. Suitable cracking catalysts may have a bulk density of from 500 kilograms per cubic meter ($kg/m^3$) to 1000 $kg/m^3$, an average particle diameter of from 50 micrometres (μm) to 90 μm, a surface area of from 10 square meters per gram ($m^2/g$) to 200 $m^2/g$, a pore volume of from 0.01 millilitres per gram (ml/g) to 0.3 ml/g, or combinations of these.

In embodiments, the FCC catalyst in the FCC unit 110 may include a catalyst support material comprising an ultra-stable Y-type (USY) zeolite. The USY zeolite may be a framework-substituted zeolite, in which a part of aluminum atoms constituting the zeolite framework are substituted with zirconium atoms, hafnium atoms, titanium atoms, or a combination of these elements. The FCC catalyst in the FCC unit 110 can further include an acidic component, where the acidic component can be selected from the group consisting of amorphous silica-alumina, zeolite, and combinations thereof. For example, the FCC catalyst in the FCC reactor 110 can be any of the catalysts described in U.S. Pat. No. 10,357,761 or in U.S. Pat. No. 9,221,036, the entire disclosures of which are incorporated by reference in the present disclosure. In embodiments, the FCC catalyst in the FCC reactor 110 may not include an active phase metal. The acidity of the zeolite alone may be sufficient to promote the cracking reactions.

As previously discussed, in embodiments, the FCC catalyst in the FCC unit 110 can include an FCC catalyst additive. The FCC catalyst additive can include a suitable shape-selective zeolite. The shape selective zeolite refers to a zeolite whose pore diameter is smaller than that of Y-type zeolite, so that hydrocarbons with only limited shape can enter the zeolite through its pores. Suitable shape-selective zeolite components include but are not limited to ZSM-5 zeolite, zeolite omega, SAPO-5 zeolite, SAPO-11 zeolite, SAPO-34 zeolite, and pentasil-type aluminosilicates. In embodiments, the FCC catalyst additive can include MFI-structured zeolites. The FCC catalyst can include from greater than 0 (zero) wt. % to 70 wt. % FCC catalyst additive, such as from 0 wt. % to 60 wt. %, from 0 wt. % to 40 wt. %, from 5 wt. % to 70 wt. %, from 5 wt. % to 60 wt. %, from 5 wt. % to 40 wt. %, from 20 wt. % to 70 wt. %, from 20 wt. % to 60 wt. %, from 20 wt. % to 40 wt. %, from 30 wt. % to 70 wt. %, from 30 wt. % to 60 wt. %, or from 30 wt. % to 40 wt. % based on the total weight of the cracking catalyst and the FCC catalyst additive. In embodiments, the FCC catalyst additive can have a bulk density of from 0.5 grams per milliliter (g/ml) to 1.0 g/ml, an average particle diameter of from 50 microns to 90 microns, a surface area of from 10 square meters per gram ($m^2/g$) to 100 $m^2/g$, and a pore volume of from 0.01 milliliters per gram (ml/g) to 0.30 ml/g.

Referring again to FIG. 1, the FCC reactor may be operable to contact the FCC feed 104 with the FCC catalyst at operating conditions sufficient to cause at least a portion of the hydrocarbons in the FCC feed 104 to undergo one or more cracking to produce the FCC effluent 122. The FCC reactor 120 may be operated at an operating temperature in the range of from 480° C. to 700° C., such as from 480° C. to 650° C., from 480° C. to 630° C., from 480° C. to 620° C., from 480° C. to 600° C., from 500° C. to 700° C., from 500° C. to 650° C., from 500° C. to 630° C., from 500° C. to 620° C., from 500° C. to 600° C., from 550° C. to 700° C., from 550° C. to 650° C., from 550° C. to 630° C., from 550° C. to 620° C., from 550° C. to 600° C., from 580° C. to 700° C., from 580° C. to 650° C., from 580° C. to 630° C., from 580° C. to 620° C., from 580° C. to 600° C., from 590° C. to 700° C., from 590° C. to 650° C., from 590° C. to 630° C., or from 590° C. to 620° C. For FCC reactors 120 that include a downer reactor, the FCC reactor 120 may be operated at reaction temperatures in the range of from 550° C. to 650° C., such as from 580° C. to 630° C. or from 590° C. to 620° C. For the FCC reactors 410 that include a riser reactor, the FCC reactor 410 may be operated at a reaction temperature in a range of from 480° C. to 650° C., from 500° C. to 620° C., or from 500° C. to 600° C. The FCC reactor 120 (downer) or FCC reactor 410 (riser) may be operated at an operating pressure in the range of from 1 kilogram-force per square centimeter ($kgf/cm^2$) (0.098 MPa, where 1 $kgf/cm^2$ is equal to 0.098 MPa) to 20 $kgf/cm^2$ (1.96 MPa), such as from 1 $kgf/cm^2$ to 10 $kgf/cm^2$ (0.98 MPa) or from 1 $kgf/cm^2$ to 3 $kgf/cm^2$ (0.294 MPa).

The FCC feed 104 may be contacted with the FCC catalyst in the FCC reactor for a contact time (the total time that the FCC feed 104 spends in contact with the FCC catalyst under reaction conditions) of from 0.1 seconds (sec) to 30 sec, such as from 0.1 sec to 10 sec, from 0.1 sec to 5 sec, from 0.1 sec to 2 sec, from 0.1 sec to 1 sec, from 0.1 sec to 0.7 sec, from 0.2 sec to 30 sec, from 0.2 sec to 10 sec, from 0.2 sec to 5 sec, from 0.2 sec to 2 sec, from 0.2 sec to 1 sec, from 0.2 sec to 0.7 sec, from 0.7 sec to 30 sec, from 0.7 sec to 10 sec, from 0.7 sec to 5 sec, from 0.7 sec to 2 sec, from 0.7 sec to 1 sec, from 1 sec to 30 sec, from 1 sec to 10 sec, from 1 sec to 5 sec, from 1 sec to 2 sec, from 2 sec to 30 sec, from 2 sec to 10 sec, or from 2 sec to 5 sec. For FCC reactors 120 that include a downer reactor, the FCC feed 104 may be contacted with the FCC catalyst in the FCC reactor 120 for a contact time of from 0.1 sec to 30 sec, from 0.1 sec to 10 sec, or from 0.2 sec to 0.7 sec. For the FCC reactors 410 that include a riser reactor, the FCC feed 104 may be contacted with the FCC catalyst in the FCC reactor 410 for a contact time of from 0.7 sec to 10 sec, from 1 sec to 5 sec, or from 1 sec to 2 sec.

The FCC feed 104 to the FCC reactor may be contacted with the FCC catalyst at a mass ratio of FCC catalyst to hydrocarbons of from 1:1 to 40:1, such as from 1:1 to 30:1, from 1:1 to 20:1, from 1:1 to 15:1, from 1:1 to 10:1, from 6:1 to 40:1, from 6:1 to 30:1, from 6:1 to 20:1, from 6:1 to 15:1, from 6:1 to 10:1, from 8:1 to 40:1, from 8:1 to 30:1, from 8:1 to 20:1, from 8:1 to 15:1, from 8:1 to 10:1, from 10:1 to 40:1, from 10:1 to 30:1, from 10:1 to 20:1, from 10:1 to 15:1, from 15:1 to 40:1, or from 15:1 to 30:1. For FCC reactors 120 that include a downer reactor, the FCC feed 104 may be contacted with the FCC catalyst in the FCC reactor 120 at a mass ratio of FCC catalyst to hydrocarbons of from 1:1 to 40:1, such as from 1:1 to 30:1, from 6:1 to 40:1, from 6:1 to 30:1, or from 10:1 to 30:1. For the FCC reactors 410 that include a riser reactor, the FCC feed 104 may be contacted with the FCC catalyst in the FCC reactor 410 at a mass ratio of FCC catalyst to hydrocarbons of from 1:1 to 20:1, such as from 1:1 to 15:1, from 1:1 to 10:1, from 6:1 to 20:1, from 6:1 to 15:1, or from 8:1 to 20:1.

In embodiments, the FCC unit 110 or FCC unit 400 may operate as a high-severity FCC unit. In high-severity operation, the FCC reactor 120 or FCC reactor 410 may operate at reaction temperatures of from 600° C. to 700° C., a mass ratio of FCC catalyst to hydrocarbons of greater than or equal to 6:1, and a contact time of less than 3 seconds.

Contacting the FCC feed 104 with the FCC catalyst at the operating conditions of the FCC reactor 120 (FIG. 2) or FCC reactor 410 (FIG. 3) may cause at least a portion of the hydrocarbon compounds in the FCC feed 104 to undergo cracking reactions to form the FCC effluent 122. The FCC effluent 122 may comprise increased concentrations of one or more of greater value chemical products and intermediates, such as but not limited to gasoline, light cycle oil (LCO), heavy cycle oil (HCO), hydrocarbon gases ($C_1$ to $C_4$ hydrocarbon gases), dry gas ($C_2$ and lighter), liquefied petroleum gas ($C_3$-$C_4$), ethylene, propylene, and mixed butenes. In embodiments, the FCC effluent 122 may comprise gasoline blending components. In embodiments, the FCC effluent 122 may include FCC naphtha, which refers to reaction products from the FCC reaction having boiling point temperatures in the range of from 36° C. to 180° C.

Referring again to FIG. 1, the FCC feed 104 may include the hydrocarbon feed 102, the aromatic bottoms stream 156, or both. The hydrocarbon feed 102 can include one or more of crude oil, synthetic crude oil, bitumen, oil sand, shale oil, coal liquid, naphtha, straight run gas oil, diesel, vacuum gas oil, vacuum residue, de-metalized oil, de-asphalted oil, light coker gas oil, heavy coker gas oil, cycle oil, gas oil, or combinations of these materials. The hydrocarbon feed 102 may be derived from one or more of crude oil, synthetic crude oil, bitumen, oil sand, shale oil, coal liquid, naphtha, diesel, vacuum gas oil, vacuum residue, de-metalized oil, de-asphalted oil, coker gas oil, cycle oil, gas oil, or combinations of these. In embodiments, the hydrocarbon feed 102 may be a straight run gas oil or other refinery intermediate stream such as but not limited to a vacuum gas oil; a deasphalted oil, demetalized oil, or both obtained from a solvent deasphalting process; a light coker gas oil or a heavy coker gas oil obtained from a coker process; cycle oil obtained from an FCC process separate from the integrated FCC unit 110 previously discussed; a gas oil obtained from a visbreaking process; or any combination of the foregoing refinery intermediate streams. In embodiments, the hydrocarbon feed 102 may include a vacuum gas oil.

The hydrocarbon feed 102 may have an atmospheric boiling point range of within a range of from 36° C. to 900° C. As used through the present disclosure, "atmospheric boiling point range" refers to the temperature interval from the initial boiling point to a final boiling point at atmospheric pressure, where the initial boiling point refers to the temperature at which the first drop of distillation product is obtained and the final boiling point refers to the temperature at which the highest-boiling point compounds evaporate. Likewise, the terms "atmospheric boiling point temperature" and "atmospheric boiling temperature" refer to the temperature at which a compound transitions from the liquid phase to the vapor phase at atmospheric pressure. In embodiments, the hydrocarbon feed 102 comprises or consists of hydrocarbons having atmospheric boiling point temperatures greater than or equal to 350° C. In embodiments, greater than or equal to 90%, greater than or equal to 95%, greater than or equal to 98%, or even greater than or equal to 99% of the hydrocarbons in the hydrocarbon feed 102 have boiling point temperatures greater than or equal to 350° C. In embodiments, greater than or equal to 90%, greater than or equal to 95%, greater than or equal to 98%, or even greater than or equal to 99% of the hydrocarbons in the hydrocarbon feed 102 have boiling point temperatures of from 350° C. to 565° C. In embodiments, the hydrocarbon feed 102 may be hydroprocessed upstream of the FCC unit 110 to produce an upgraded hydrocarbon feed. Hydroprocessing the hydrocarbon feed 102 may include hydrotreating or hydrocracking the hydrocarbon feed 102. In embodiments, the hydrocarbon feed 102 can include a stream from a residue hydroprocessing unit, the stream comprising hydrocarbon constituents boiling at temperatures greater than specification.

In embodiments, the hydrocarbon feed 102 is hydrogen-rich. As used throughout the present disclosure, the term "hydrogen rich" refers to a composition or stream having greater than or equal to 12 weight percent (wt. %) elemental hydrogen based on the total weight of the composition or stream. The elemental hydrogen may include covalently bonded hydrogen atoms in the various hydrocarbon constituents of the hydrocarbon feed 102 as well as hydrogen ($H_2$) molecules. The hydrocarbon feed 102 may have greater than or equal to 12 wt. % elemental hydrogen based on the total weight of the hydrocarbon feed 102.

As previously discussed, coke formed in the FCC reactor 120 or FCC reactor 410 deposits onto the surfaces of the FCC catalyst to produce used FCC catalyst 124. The used FCC catalyst 124 is passed to the catalyst regenerator 140, which contacts the used FCC catalyst 124 with an oxygen-containing gas to combust the coke deposits deposited on the used FCC catalyst 124. Combustion of the coke deposits on the used FCC catalyst 124 removes at least a portion of or all of the coke deposits from the used FCC catalyst 124 to produce the regenerated FCC catalyst 144, thereby clearing obstructions to catalytically active sites on the FCC catalyst and restoring at least a portion of the catalytic activity of the regenerated FCC catalyst 144. Additionally, the combustion of the coke deposits heats the regenerated FCC catalyst 144 to increase the temperature of the regenerated FCC catalyst 144. Ideally, the coke deposits on the used FCC catalyst 124 produced in the FCC reactor 120 are sufficient so that combustion of the coke deposits heats the regenerated FCC catalyst 144 to a temperature greater than or equal to the reaction temperature in the FCC reactor 120.

However, when the amount of coke produced in the FCC reactor 120 is not sufficient, combustion of the coke deposits in the catalyst regenerator 140 do not heat the regenerated FCC catalyst 144 to temperatures greater than or equal to the reaction temperature in the FCC reactor 120. Since FCC reactions are endothermic, heat is required for the cracking reactions. If the regenerated FCC catalyst 144 is not heated to a sufficiently high temperature that is greater than or equal to the target reaction temperature in the FCC reactor 120, then the FCC reactor 120 becomes heat deficient, and the heat transfer from the regenerated FCC catalyst 144 will not be enough to propagate the FCC reactions at the desired reaction rate, resulting in reduced yield, formation of unwanted by-products, or combinations of these.

Insufficient formation of coke deposits can occur when the hydrocarbon feed 102 to the FCC unit 110 is hydrogen-rich, such as having greater than or equal to 12 wt. % hydrogen based on the total weight of the hydrocarbon feed 102. When the hydrocarbon feed 102 has greater than or equal to 12 wt. % hydrogen, reaction of the hydrocarbon feed 102 in the FCC reactor 120 does not produce enough coke deposits on the used FCC catalyst 124, which causes the FCC unit 110 to become heat deficient, leading to reduced yield, increase in side reactions, or combinations of these.

The systems and methods of the present disclosure provide for increasing and controlling the production of coke deposits in the FCC reactor (FCC reactor 120 or FCC reactor 410) to ensure that the amount of coke deposits on the used FCC catalyst 124 satisfies the heat requirements of the FCC unit 110 when combusted in the catalyst regenerator 140. Referring again to FIG. 1, the systems 100 of the present disclosure further include the aromatics recovery complex (ARC) 150 disposed upstream of the FCC unit 110. The ARC may be operable to process a reformate 152 to produce one or a plurality of aromatic product streams and the aromatic bottoms stream 156, where the reformate 152 is produced from catalytically reforming naphtha fractions of crude oil. The ARC 150 may be in fluid communication with the FCC unit 110 to pass at least a portion of an aromatic bottoms stream 156 from the ARC 150 to the FCC unit 110. The aromatic bottoms stream 156 may be passed directly to the FCC reactor 120 of the FCC unit 110 or may be combined with the hydrocarbon feed 102 upstream of the FCC unit 110 to produce the FCC feed 104.

In embodiments, the aromatic bottoms stream 156 can comprise greater than or equal to 50 weight percent (wt. %) $C_{9+}$ aromatic compounds. In other embodiments, the aromatic bottoms stream 156 can comprise greater than or equal to 50 wt. % $C_{10+}$ aromatic compounds or greater than or equal to $C_{11+}$ aromatic compounds. Subjecting these $C_9$ aromatic compounds, the $C_{10}$ aromatic compounds, the $C_{11+}$ aromatic compounds, or combinations of these of the aromatic bottoms stream 156 to fluidized catalytic cracking produces greater amounts of coke deposits on the FCC catalyst compared to the hydrocarbon feed 102. The weight of coke produced per unit weight of aromatic bottoms stream 156 can be greater than the weight of coke produced per unit weight of hydrocarbon feed 102 by at least 40%, at least 50%, at least 60%, at least 70%, or even at least 80%. In embodiments, the coke deposits produced in the catalyst regenerator 140 can include a first amount of coke produced through catalytic cracking of the hydrocarbon feed 102 and a second amount of coke produce through catalytic cracking of the aromatic bottoms stream 156. The second amount of coke produced per unit weight of the aromatic bottoms stream 156 passed to the FCC unit is at least 40% greater than the first amount of coke produced per unit weight of the hydrocarbon feed 102 passed to the FCC unit, such as at least 50% greater, at least 60% greater, at least 70% greater, or even at least 80% greater than the first amount of coke produced per unit weight of the hydrocarbon feed 102.

The increased coke deposits produced in the FCC reactor 120 due to introduction of the aromatic bottoms stream 156 increases the heat generated through combustion of the additional coke deposits in the catalyst regenerator 140. The additional heat increases the temperature of the regenerated catalyst 144 to temperatures greater than the temperature achieved by only passing the hydrocarbon feed 102 to the FCC unit 110. The increased coke produced in the FCC reactor 120 due to introduction of the aromatic bottoms stream 156, when combusted in the catalyst regenerator 140, can increase the temperature of the regenerated catalyst to temperatures greater than or equal to the reaction temperature in the FCC reactor 120. The flow rate of the aromatic bottoms stream 156 to the FCC unit 110 can be controlled in response to changes in composition of the hydrocarbon feed 102 as well as changes in the heat produced in the catalyst regenerator 140.

Referring again to FIG. 1, the aromatics recovery complex 150 receives the reformate 152 form a naphtha reforming process. As used throughout the present disclosure, the term "reformate" refers to the reaction effluent produced from a naphtha reforming process that is operable to catalytically reform a naphtha stream to produce aromatic compounds. The aromatics recovery complex 150 may process the reformate 152 to produce at least one aromatic product effluent 154, a gasoline pool stream 158, and an aromatic bottoms stream 156. The aromatics recovery complex 150 may be operable to separate the reformate 152 into the at least one aromatic product effluent 154, the gasoline pool stream 158, and the aromatic bottoms stream 156. The aromatics recovery complex 150 may also be operable to convert one or more aromatic compounds in the reformate 152 to other aromatic compounds, such as xylenes or other gasoline pool constituents.

In the aromatics recovery complex 150, the reformate 152 may be subjected to several processing steps to recover greater value products, such as xylenes and benzene, and to convert lower value products, such as toluene, into the greater value products. For example, the aromatic compounds present in the reformate 152 can be separated into different fractions by carbon number, such as but not limited to a $C_{5-}$ fraction, a $C_6$ fraction comprising benzene, a $C_7$ fraction comprising toluene, a $C_8$ fraction including xylenes, and ethylbenzene, and an aromatic bottom stream 156 comprising at least $C_{11+}$ aromatic compounds. In embodiments, the aromatic bottom stream 156 can further include $C_9$ aromatic compounds, $C_{10}$ aromatic compounds, or combinations of these in addition to the $C_{11+}$ compounds. The $C_8$ fraction may be subjected to one or more operations to convert ethylbenzene, ortho-xylene, and meta-xylene to produce greater yield of para-xylene, which is of greater value. Para-xylene can be recovered in high purity from the $C_8$ fraction by separating the para-xylene from the ortho-xylene, meta-xylene, and ethylbenzene using selective adsorption or crystallization. The ortho-xylene and meta-xylene remaining from the para-xylene separation can be isomerized to produce an equilibrium mixture of xylenes. The ethylbenzene can be isomerized into xylenes or can be dealkylated to benzene and ethane. The para-xylene can then be separated from the ortho-xylene and the meta-xylene using adsorption or crystallization, and the para-xylene-depleted-stream can be recycled to extinction to the isomerization unit and then to the para-xylene recovery unit until all of the ortho-xylene and meta-xylene are converted to para-xylene and recovered.

Toluene can be recovered as a separate fraction, such as a $C_7$ fraction, and then can be converted into greater value products, such as but not limited to benzene or xylenes. One toluene conversion process can include the disproportionation of toluene to make benzene and xylenes. Another toluene conversion process can include the hydrodealkylation of toluene to make benzene. Another toluene conversion process can include the transalkylation of toluene to make benzene and xylenes. Both toluene disproportionation and toluene hydrodealkylation can result in the formation of benzene.

Figure 4:
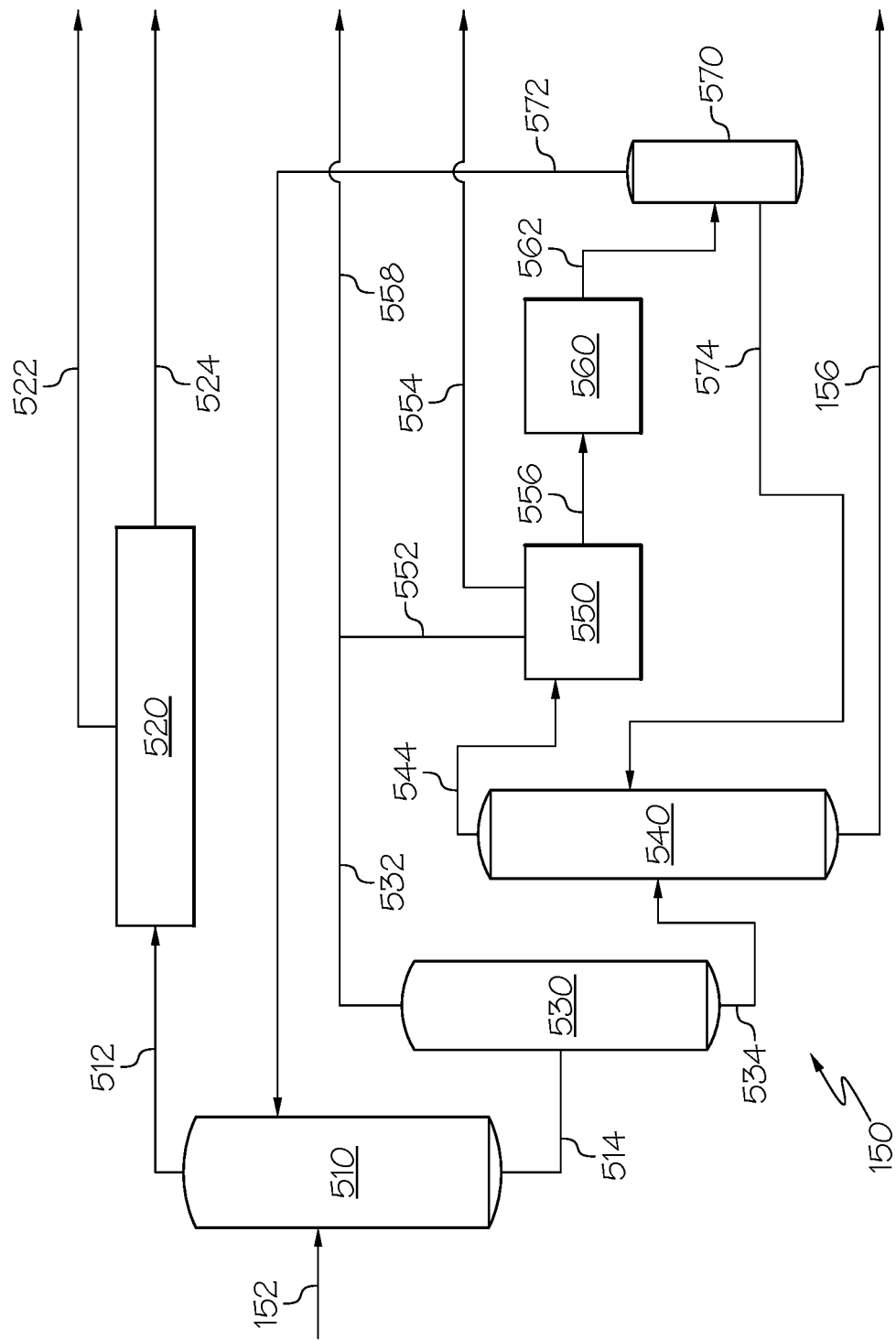
FIG. 4 schematically depicts a generalized flow diagram of an aromatics recovery complex (ARC) of the system of FIG. 1, according to one or more embodiments shown and described in this disclosure.

Referring to FIG. 4, an embodiment of the ARC 150 is schematically depicted. The reformate 152 from a naphtha reforming unit can be passed to a reformate splitter 510 that can separate the reformate 152 into two fractions: a light reformate stream 512 comprising $C_5$-$C_6$ hydrocarbons, and a heavy reformate stream 514 comprising $C_{7+}$ hydrocarbons. In embodiments, the reformate 152 may be hydrotreated (not shown) prior to being passed to the ARC 150. Hydrotreating the naphtha reformate 152 may remove mono-olefins, diolefins, or both before the reformate 152 is passed to the ARC 150. The light reformate stream 512 may be passed to a benzene extraction unit 520, which may extract the benzene as benzene product in benzene stream 524 and recover substantially benzene-free gasoline in raffinate motor gasoline (mogas) stream 522. The heavy reformate stream 514 may be passed to a splitter 530 which may separate the heavy reformate stream 514 to produce a $C_7$ mogas stream 532 and a $C_{8+}$ hydrocarbon stream 534. The $C_{8+}$ hydrocarbon stream 534 may be passed to a clay tower (not shown) to remove olefin compounds from the $C_{8+}$ hydrocarbon stream 534.

Still referring to FIG. 4, the $C_{8+}$ hydrocarbon stream 534 may be passed to a xylene rerun unit 540, which may separate the $C_{8+}$ hydrocarbon stream 534 into a $C_8$ hydrocarbon stream 544 and the aromatic bottoms stream 156. The aromatic bottoms stream 156 can include at least $C_{11+}$ aromatic compounds. In embodiments, the aromatic bottoms stream 156 can comprise a $C_{11+}$ fraction comprising greater than or equal to 50 wt. % $C_{11+}$ aromatic compounds. In embodiments, the aromatic bottoms stream 156 can comprise a $C_{10+}$ fraction comprising greater than or equal to 50 wt. % $C_{10+}$ aromatic compounds. In other embodiments, the aromatic bottoms stream 156 can comprise a $C_{9+}$ fraction comprising greater than or equal to 50 wt. % $C_{9+}$ aromatic compounds. $C_8$ hydrocarbon stream 544 may be passed to a para-xylene recovery unit 550 that may recover para-xylene as para-xylene product stream 554. The para-xylene recovery unit 550 may also produce a $C_7$ cut mogas stream 552, which may be combined with the $C_7$ cut mogas stream 532 from splitter 530 to produce $C_7$ cut mogas stream 558. The C7 cut mogas stream 558 can be passed out of the ARC 150 as one of the aromatic product effluents 154 (FIG. 1) or as part of the gasoline pool stream 158 (FIG. 1). Other xylenes (meta-xylene, ortho-xylene, and any trace para-xylene not passed out of the para-xylene recovery unit 550 in the para-xylene product stream 554) may be recovered and passed to a xylene isomerization unit 560 through mixed xylene stream 556. The xylene isomerization unit 560 may isomerize at least a portion of ortho-xylene, meta-xylene, or both, in the mixed xylene stream 556 to para-xylene. The isomerization effluent 562 may be passed from the xylene isomerization unit 560 to a splitter column 570, which may separate the isomerization effluent 562 into a splitter top stream 572 and a splitter bottoms stream 574. The splitter bottoms stream 574 may include the para-xylene produced in the xylene isomerization unit 560 as well as the remaining ortho-xylene and meta-xylene. The splitter bottoms stream 574 may be passed back to the xylene rerun unit 540 so that the xylenes can be separated and passed to the para-xylene recovery unit 550 for further recovery of para-xylene. The splitter top stream 572 may be recycled back to reformate splitter 510.

The raffinate mogas stream 522 may be passed out of the ARC 150 as the gasoline pool stream 158 (FIG. 1), which may be passed to a gasoline pool (not shown) for blending into fuels. The gasoline pool stream 158 comprising the raffinate mogas stream 522 may have less than or equal to 3 volume percent benzene, or less than or equal to 1 volume percent benzene. The one or more aromatic product streams 154 may include one or more of the benzene stream 524, the para-xylene product stream 554, the $C_7$ cut mogas stream 558, or combinations of these, each of which may be passed out of the ARC 150. The aromatic bottoms stream 156 includes at least the $C_{11+}$ aromatic compounds from the xylene rerun unit 540 of the ARC 150. The aromatic bottoms stream 156 may include the heavier fraction, such as $C_{11+}$ alkylated mono-aromatics, and may be a more complex mixture of compounds including di-aromatics. The aromatic bottoms stream 156 may include $C_{11+}$ aromatic compounds having an atmospheric boiling temperature in a range of from 180° C. to 450° C. The aromatic bottoms stream 156 may also include $C_9$ aromatic compounds, $C_{10}$ aromatic compounds, or both in addition to the $C_{11+}$ aromatic compounds. Since olefins are detrimental in the extraction/adsorption process within the ARC 150, olefin compounds can be removed using a clay tower or selective hydrogenation. As previously discussed, the $C_{8+}$ hydrocarbon stream 534 from the splitter 530 may be passed to a clay tower (not shown) to remove olefin compounds from the $C_{8+}$ hydrocarbon stream 534. Due to the acidic nature of the clays, olefinic aromatics such as styrene can react with other aromatic molecule via an alkylation reaction to form bridged di-aromatic molecules. These di-aromatic molecules can end up in the aromatic bottoms stream 156.

Referring again to FIG. 1, the portion of the aromatic bottoms stream 156 passed from the ARC 150 to the FCC unit 110 includes $C_{11+}$ aromatic compounds (aromatic compounds having greater than or equal to 11 carbon atoms). The portion of the aromatic bottoms stream 156 passed to the FCC unit 110 may comprise at least 50 weight percent (wt. %), at least 70 wt. %, at least 80 wt. %, at least 90 wt. %, or even at least 95 wt. % $C_{11+}$ aromatic compounds based on the total weight of the aromatic bottoms stream 156. The portion of the aromatic bottom stream 156 passed to the FCC unit 110 may include $C_{10+}$ aromatic compounds (aromatic compounds having greater than or equal to 10 carbon atoms). The portion of the aromatic bottoms stream 156 passed to the FCC unit 110 may comprise at least 50 weight percent (wt. %), at least 70 wt. %, at least 80 wt. %, at least 90 wt. %, or even at least 95 wt. % $C_{10+}$ aromatic compounds based on the total weight of the aromatic bottoms stream 156. The portion of the aromatic bottom stream 156 passed to the FCC unit 110 may include $C_{9+}$ aromatic compounds (aromatic compounds having greater than or equal to 9 carbon atoms). The portion of the aromatic bottoms stream 156 passed to the FCC unit 110 may comprise at least 50 weight percent (wt. %), at least 70 wt. %, at least 80 wt. %, at least 90 wt. %, or even at least 95 wt. % $C_{9+}$ aromatic compounds based on the total weight of the aromatic bottoms stream 156. The portion of the aromatic bottoms stream 156 passed to the FCC unit 110 may include greater than 50 weight percent constituents having atmospheric boiling point temperatures greater than or equal to 150° C., or even greater than or equal to 180° C.

Referring again to FIG. 1, the system 100 may include an aromatic bottoms transfer line 160 extending from the ARC 150 to the FCC unit 110, or from the ARC 150 and into contact with the hydrocarbon feed 102 to the FCC unit 110. The aromatic bottoms transfer line 160 may provide fluid communication between the aromatic bottoms stream 156 from the ARC 150 and the FCC unit 110. The aromatic bottoms transfer line 160 may be operable to transfer at least a portion of the aromatic bottoms stream 156 from the ARC 150 directly to the FCC unit 110 or into contact with the hydrocarbon feed 102 upstream of the FCC unit 110. Excess of the aromatic bottoms stream 156 may be removed from the system through aromatic bottoms purge 164.

The aromatic bottoms transfer line 160 may include the aromatic bottoms control valve 162. The aromatic bottoms control valve 162 may be a flow control valve that is operable to control the flow rate of the aromatic bottoms stream 156 to the FCC unit 110. The aromatic bottoms control valve 162 may be operable to receive a control signal indicative of a position of the aromatic bottoms control valve 162 and to change a position of valve based on the control signal, where changing the position of the aromatic bottoms control valve 162 changes the flow rate of the aromatic bottoms stream 156 through the aromatic bottoms transfer line 160 to the FCC unit 110.

The flow rate of the aromatic bottoms stream 156 to the FCC unit 110 may be controlled by the aromatic bottoms control valve 162 so that the amount of additional coke produced in the FCC reactor 120 through introduction of the aromatic bottoms stream 156 is sufficient to satisfy the heat requirements of the FCC reactor 120. In embodiments, the flow rate of the aromatic bottoms stream 156 may be sufficient to produce enough coke in the FCC reactor 120 to increase the temperature of the regenerated catalyst 144 in the regenerator to a temperature greater than or equal to the reaction temperature in the FCC reactor 120. The flow rate of the aromatic bottoms stream 156 may be controlled by the aromatic bottoms control valve 162 so that the FCC feed 104 to the FCC unit 110 comprises from 1 wt. % to 40 wt. % aromatic bottoms stream 156 based on the total mass flow rate of the FCC feed 104, which includes the aromatic bottoms stream 156 and the hydrocarbon feed 102 to the FCC unit 110. In embodiments, the FCC feed 104 may include from 1 wt. % to 30 wt. %, from 1 wt. % to 20 wt. %, from 1 wt. % to 10 wt. %, from 1 wt. % to 5 wt. %, from 2 wt. % to 40 wt. %, from 2 wt. % to 30 wt. %, from 2 wt. % to 20 wt. % from 2 wt. % to 10 wt. %, from 2 wt. % to 5 wt. %, from 5 wt. % to 40 wt. %, from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, from 20 wt. % to 40 wt. %, from 20 wt. % to 30 wt. %, or from 30 wt. % to 40 wt. % aromatic bottoms stream 156 based on the total mass flow rate of the FCC feed 104.

Referring again to FIG. 1, in embodiments, the system 100 may further include a hydrocarbon feed control valve 166 operable to control the flow of the hydrocarbon feed 102 to the FCC unit 110. Thus, the amount of aromatic bottoms stream 156 in the FCC feed 104 may be controlled by controlling the flow rate of the aromatic bottoms stream 156 with aromatic bottoms control valve 162, controlling the flow rate of the hydrocarbon feed 102 with the hydrocarbon feed control valve 166, or both.

Referring again to FIG. 1, the system 100 may further include a system controller 200 communicatively coupled to the aromatic bottoms control valve 162, the hydrocarbon feed control valve 166, or both. The system controller 200 may include one or a plurality of processors 202, one or a plurality of memory modules 204, and computer readable and executable instructions 206 stored on the memory modules 204. The computer readable and executable instructions 206, when executed by the processors 202, may cause the system controller 200 to control the position of the aromatic bottoms control valve 162, which controls the flow rate of the aromatic bottoms stream 156 to the FCC unit 110. The computer readable and executable instructions 206, when executed by the processors 202, may cause the system controller 200 to control the position of the hydrocarbon feed control valve 166, which controls the flow rate of the hydrocarbon feed 102 to the FCC unit 110.

In embodiments, the system 100 may further include one or more sensors 148 operatively coupled to the FCC unit 110, such as to the catalyst regenerator 140 of the FCC unit 110. The sensors 148 may be operable to measure or determine one or more operating parameters of the FCC unit 110 relating to the amount of coke produced in the FCC unit 110. Operating parameters may include but are not limited to, one or more of a temperature of the catalyst regenerator 140, pressure of the catalyst regenerator 140, reaction temperature of the FCC reactor 120, temperature of the regenerated catalyst 144, temperature of the flue gas 146, composition of the flue gas 146, flow rate of the flue gas 146, flow rate of the oxygen-containing gas 142, or combinations of these. In embodiments, the sensor 148 may be operable to determine a temperature of the catalyst regenerator 140, the temperature of the regenerated FCC catalyst 144, or both. The sensor 148 may be operable to send a signal indicative of the measured operating parameter to the system controller 200.

The computer readable and executable instructions 206, when executed by the processors 202, may cause the system controller 200 to receive the signal indicative of the operating parameter of the FCC unit 110 from the sensor 148, determine an amount of the aromatic bottoms stream 156 to pass to the FCC unit 110, and control the aromatic bottoms control valve 162 based on the determination of the amount of the aromatic bottoms stream 156 to pass to the FCC unit 110. To control the aromatic bottoms control valve 162, the computer readable and executable instructions 206, when executed by the processors 202, may further cause the system controller 200 to calculate a position of the aromatic bottoms control valve 162 based on the determination of the operating parameter of the FCC unit 110, send a control signal indicative of the position of the aromatic bottoms control valve 162 to the aromatic bottoms control valve 162. The control signal indicative of the position may cause the aromatic bottoms control valve 162 to change position, which changes the flow rate of the aromatic bottoms stream 156 to the FCC unit 110. In embodiments, computer readable and executable instructions 206, when executed by the processors 202, may cause the system controller 200 to determine concentration of the aromatic bottoms stream 156 in the FCC feed 104 passed to the FCC unit 110, and control the aromatic bottoms control valve 162, the hydrocarbon feed control valve 166, or both based on the determination of the concentration of the aromatic bottoms stream 156 in the FCC feed 104 passed to the FCC unit 110.

Referring to FIG. 1, operation of the FCC unit will be described in further detail. Although described in the context of FCC unit 110 comprising an FCC reactor 120 that is a downer reactor, it is understood that operation of an FCC unit comprising the FCC reactor 410 that includes a riser 420 reactor can be very similar. In operation, the hydrocarbon feed 102 is passed to the FCC reactor 120 of the FCC unit 110 as at least a portion of the FCC feed 104. In embodiments, the hydrocarbon feed 102 may be known to be hydrogen-rich and at least a portion of the aromatic bottom stream 156 may be combined with the hydrocarbon feed 102 to produce the FCC feed 104. In some embodiments, the portion of the aromatic bottoms stream 156 can be passed separately and directly to the FCC reactor 120 and mixed with the hydrocarbon feed 102 in the FCC reactor 120. The FCC feed 104 comprising the hydrocarbon feed 102, aromatic bottoms stream 156, or both, is combined with the regenerated FCC catalyst 144, fresh FCC catalyst 145, or both to produce a reaction mixture. The reaction mixture comprising solid catalyst particles and hydrocarbons from the hydrocarbon feed 102 and aromatic bottoms stream 156 pass through the reaction zone of the FCC reactor 120. Contact of the hydrocarbons with the FCC catalyst (regenerated FCC catalyst 144, fresh FCC catalyst 145, or both) under the reaction conditions in the FCC reactor 120 causes catalytic cracking reactions, which convert at least a portion of the hydrocarbons to greater value compounds and coke. The reaction conditions may be any reaction conditions previously discussed for FCC reactor 120 or FCC reactor 410.

At the downstream end of the FCC reactor 120, the reaction mixture is separated into the solid particles of the used FCC catalyst 124 and the FCC effluent 122 in the catalyst separation zone 132. The used FCC catalyst 124 may include the coke deposits and residual hydrocarbons from the FCC effluent 122 trapped in pores or in spaces between catalyst particles. The used FCC effluent 122 may be stripped with a stripping gas 126 in the stripping zone 134 to remove at least a portion of the greater value chemical products and intermediate or unconverted hydrocarbons from the used FCC effluent 122. The stripping gas and recovered hydrocarbon compounds from the stripping zone 134 may be combined with the FCC effluent 122 and passed out of the FCC unit 110.

The FCC effluent 122 may include the reaction products as well as any unconverted hydrocarbons. The FCC effluent 122 may further include the stripping gases used to strip hydrocarbons from the used FCC catalyst 124. The FCC effluent 122 may be passed out of the FCC unit 110. In embodiments, the FCC effluent 122 may be passed to an FCC separation unit 180 (FIG. 6) for further processing.

The used FCC catalyst 124 is then passed to the catalyst regenerator 140 where it is contacted with an oxygen-containing gas 142. Contacting the used FCC catalyst 124 with the oxygen-containing gas 142 may cause combustion of the coke deposits on the used FCC catalyst 124. Combustion of the coke deposits may remove the coke deposits from the used FCC catalyst 124 to produce the regenerated FCC catalyst 144. The combustion of the coke deposits may also produce heat, which may increase the temperature of the regenerated catalyst 144. The regenerated catalyst 144 is then passed back to the FCC reactor 120. The FCC catalyst circulates through the FCC unit 110 in a continuous loop, with fresh FCC catalyst 145 added as needed to account for catalyst attrition and loss of catalytic activity due to permanent deactivation of portions of the FCC catalyst.

Operation of the FCC unit 110 may further include measuring one or more operating parameters of the FCC unit 110 with one or more sensors 148. The operating parameters can be indicative the amount of coke deposits produced in the FCC reactor 120 and, thus, the amount of heat produced in the catalyst regenerator 140. The flow rate of the aromatic bottoms stream 156 to the FCC unit 110 may be adjusted depending on the measured operating parameters of the FCC unit 110. When the operating parameters of the FCC unit indicate that the heat produced by combustion of coke deposits in the catalyst regenerator 140 is or may soon become less than the heat demand of the FCC reactor 120, the system controller 200 may operate to increase the flow rate of aromatic bottoms stream 156 to the FCC unit 120 or the proportion of aromatic bottoms stream 156 in the FCC feed 104 passed to the FCC unit 110. Conversely, when the operating parameters of the FCC unit 110 indicate that the heat produced by combustion of coke deposits in the catalyst regenerator 140 is or will soon become excessively greater than the heat demand of the FCC reactor 120, the system controller 200 may operate to decrease the flow rate of aromatic bottoms stream 156 to the FCC unit 110 or the proportion of aromatic bottoms stream 156 in the FCC feed 104 passed to the FCC unit 110. The amount of heat generated by combustion of coke deposits in the catalyst regenerator 140 becomes excessively greater than the heat demand of the FCC reactor 120 when the heat generated causes the temperature of the regenerated catalyst to exceed an upper setpoint limit. The upper setpoint limit can be determined based on the characteristics of the hydrocarbon feed, the specifications for the FCC effluent, the economics of the FCC unit 110, other factors, or combinations of these. In some cases, excessive heat generation, if not mitigated, can increase the temperature in the FCC reactor 120 to a point where alternative side reactions, such as thermal cracking reactions increase.

In embodiments, the composition of the hydrocarbon feed 102, such as the hydrogen content of the hydrocarbon feed 102, may be constantly changing, and the system controller 200 may be operable to continuously monitor the operation of the FCC unit 110 and adjust the proportion of the aromatic bottoms stream 156 passed to the FCC unit 110 in response to changing operating parameters of the FCC unit 110 caused by the changing composition of the hydrocarbon feed 102.

Figure 5:
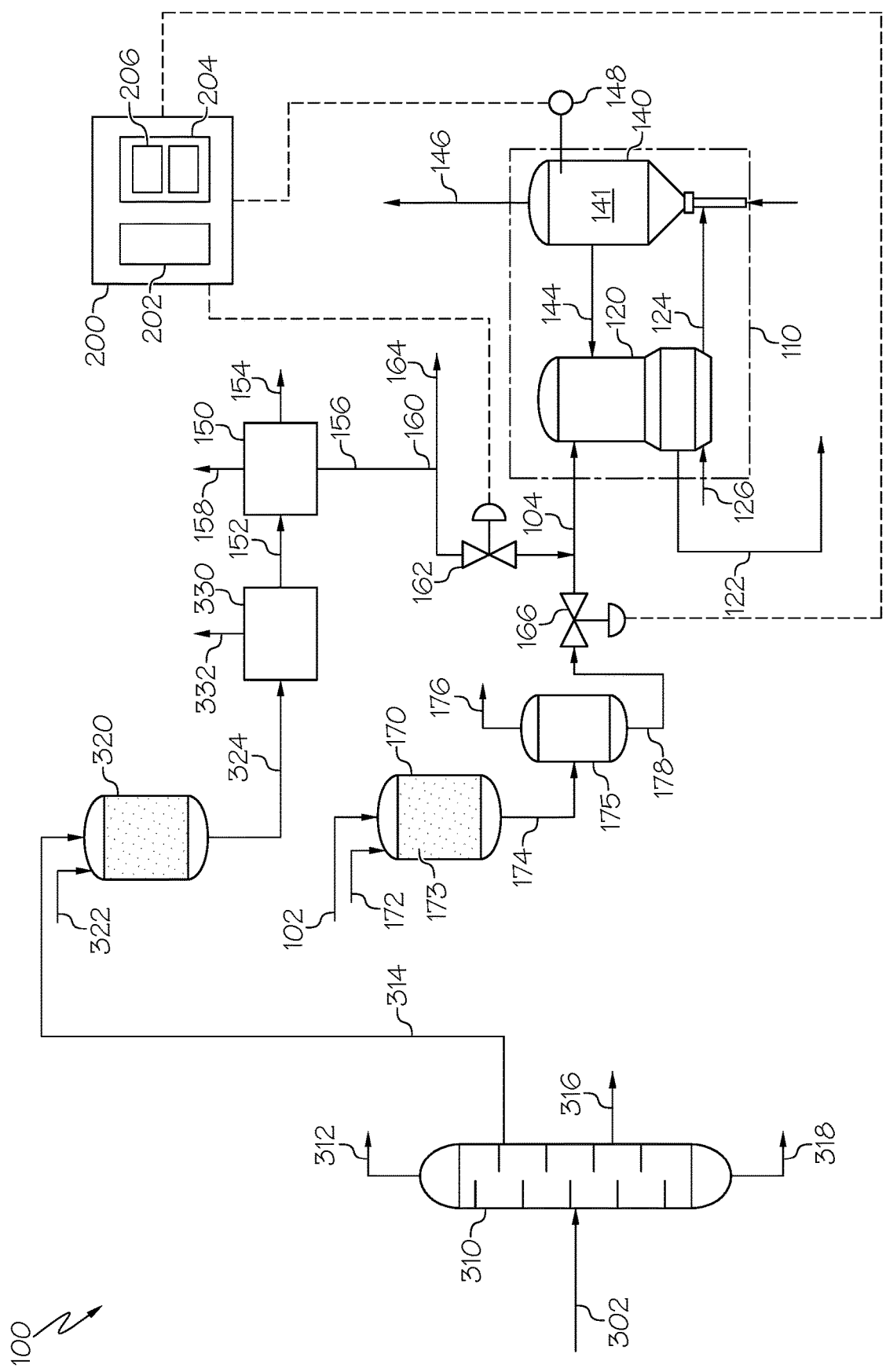
FIG. 5 schematically depicts a generalized flow diagram of another system for upgrading a hydrocarbon feed, according to one or more embodiments shown and described in this disclosure.

Referring now to FIG. 5, the system 100 may include producing the aromatic bottoms stream 156 through processing a heavy hydrocarbon stream to produce a naphtha stream, reforming the naphtha stream in a naphtha reforming unit to produce a reformate, and then processing the reformate in the ARC 150 to produce the aromatic bottoms stream 156. In particular, the system 100 can include a heavy hydrocarbon feed 302, a distillation system 310, a naphtha hydrotreating reactor (NHT) 320 downstream of the distillation system 310, a naphtha reforming unit (NREF) 330 disposed downstream of the NHT 320, and the ARC 150 disposed downstream of the NREF 330.

The heavy hydrocarbon feed 302 may be different from the hydrocarbon feed 102. The heavy hydrocarbon feed 302 may include one or more heavy oils, such as but not limited to crude oil, vacuum residue, tar sands, bitumen, other heavy oil streams, or combinations of these. It should be understood that, as used in this disclosure, a "heavy oil" may refer to a raw hydrocarbon, such as crude oil, which has not been previously processed through distillation, or may refer to a hydrocarbon which has undergone some degree of processing prior to being introduced to the system 100 as the heavy hydrocarbon feed 302. The heavy hydrocarbon feed 302 may have a density of greater than or equal to 0.80 grams per milliliter. The heavy hydrocarbon feed 302 may have an end boiling point (EBP) of greater than 565° C. The heavy hydrocarbon feed 302 may have a concentration of nitrogen of less than or equal to 3000 parts per million by weight (ppmw). In one or more embodiments, the heavy hydrocarbon feed 302 may be a crude oil having an American Petroleum Institute (API) gravity of from 20 degrees to 50 degrees. For example, the heavy hydrocarbon feed 302 may include a light crude oil, a heavy crude oil, or combinations of these. When the hydrocarbon feed 302 comprises a crude oil, the crude oil may be a whole crude or may be a crude oil that has undergone at some processing, such as desalting, solids separation, scrubbing. For example, the hydrocarbon feed 302 may be a de-salted crude oil that has been subjected to a de-salting process.

Referring to FIG. 5, the heavy hydrocarbon feed 302 may be introduced to the distillation system 310, which may include one or more distillation units or other separation units that, in combination, may separate the heavy hydrocarbon feed 302 into a plurality of streams, such as but not limited to one or more of a light gas stream 312, a naphtha stream 314, a diesel stream 316, and a residue stream 318. The distillation system 310 may include an atmospheric distillation unit, a vacuum distillation unit, or both. The distillation system 310 may include a single fractionation column or may include a plurality of atmospheric distillation units, vacuum distillation units, or both, which may be operated in series or in parallel to separate the heavy hydrocarbon feed 302 into the naphtha stream 314 and one or more of the light gas stream 312, diesel stream 316, residue stream 318, or other distillation fractions.

The naphtha stream 314 may include at least 90%, at least 95%, at least 98%, or at least 99% by weight of the constituents of the heavy hydrocarbon feed 312 having an atmospheric boiling point temperature of between 36 degrees Celsius (° C.) to 180° C. The diesel stream 316 may include at least 90% of the constituents of the heavy hydrocarbon feed 312 having an atmospheric boiling point temperature of between 180° C. to 370° C. The residue stream 318 may include at least 90% of the constituents of the heavy hydrocarbon feed 312 having an atmospheric boiling point temperature of greater than or equal to 370° C. The light gas stream 312 may include at least 90% of the constituents of the heavy hydrocarbon feed 312 having an atmospheric boiling point temperature of less than or equal to 36° C.

Referring again to FIG. 5, the system 100 can include the NHT 320 disposed downstream of the distillation system 310 and may operate to contact the naphtha stream 314 with hydrogen 322 in the presence of at least one hydrotreating catalyst to produce a hydrotreated naphtha 324. The NHT 320 may be in fluid communication with the distillation system 310 to receive the naphtha stream 314 directly from the distillation system 310. Hydrogen 322 may be directly passed to the NHT 320 or combined with the naphtha stream 314 upstream of the NHT 320. Contact of the naphtha stream 314 with hydrogen 322 in the presence of the hydrotreating catalysts in the NHT 320 may remove at least a portion of the sulfur compounds, nitrogen compounds, or both, from the naphtha stream 314. The NHT 320 may be operated at operating conditions, such as temperature, pressure, hydrogen partial pressure, liquid hourly space velocity (LHSV), and catalyst selection and loading, which are effective to remove at least enough sulfur, nitrogen, or both to meet requisite product specifications. In embodiments, the NHT 320 may be operated under relatively mild conditions that are sufficient to reduce the total concentration of nitrogen and sulfur in the hydrotreated naphtha 324 to less than or equal to 0.5 parts per million by weight based on the total weight of the hydrotreated naphtha 324.

The hydrotreating catalyst in the NHT 320 is not particularly limited and may include any hydrotreating catalyst capable of hydrotreating the naphtha stream 314 to remove nitrogen compounds or other species having an adverse effect on the NREF 330 downstream of the NHT 320. The hydrotreating catalyst may include one or more metals from Groups 5, 6, or 8-10 of the International Union of Pure and Applied Chemistry periodic table of the elements (IUPAC periodic table), which may be in the form of metals, metal oxides, or metal sulfides. The hydrotreating catalyst may further comprise a support material, such as silica, alumina, titania, or combination of these, and the metal(s) may be disposed on the support material. In embodiments, the hydrotreating catalyst in the NHT 320 can include a hydrodesulfurization catalyst (HDS catalyst) that may contain at least one metal from IUPAC Group 6, such as molybdenum, and at least one metal from IUPAC Groups 8-10, such as nickel or Cobalt. In embodiments, the hydrotreating catalyst in the NHT 320 can include a hydrodenitrogenation catalyst (HDN catalyst) that may contain at least one metal from IUPAC Group 6, such as molybdenum, and at least one metal from IUPAC Groups 8-10, such as nickel. The HDN catalyst can also include at least one dopant selected from the group consisting of boron, phosphorus, silicon, halogens, and combinations thereof. Other hydrotreating catalysts are contemplated.

The operating conditions of the NHT 320 are not particularly limited. The NHT 20 may be operated at a hydrotreating temperature of from 250° C. to 400° C., such as from 350° C. to 380° C. The NHT 320 may be operated at a hydrotreating pressure of from 10 bar (1,000 kilopascals (kPa)) to 50 bar (5,000 kPa), such as from 20 bar (2,000 kPa) to 40 bar (4,000 kPa). The NHT 320 may operate with a liquid hourly volume space velocity (LHSV) of from 2 per hour ($hr^{-1}$) to 10 $hr^{-1}$, such as from 4 $hr^{-1}$ to 8 $hr^{-1}$. The volume ratio of hydrogen 322 to the naphtha stream 314 introduced to the NHT 320 may be from 50:1 to 300:1. The hydrotreated naphtha 324 may have a concentration of sulfur less than or equal to 0.5 parts per million by weight based on the total weight of the hydrotreated naphtha 324. The hydrotreated naphtha 324 may have a concentration of nitrogen less than or equal to 0.5 parts per million by weight based on the total weight of the hydrotreated naphtha 324.

Referring again to FIG. 5, the system 100 may include the naphtha reforming unit (NREF) 330, which may be disposed downstream of the NHT 320. The NREF 330 may be in fluid communication with the NHT 320 to receive the hydrotreated naphtha 324 from the NHT 320. The NREF 330 may operate to reform the hydrotreated naphtha 324 to produce the reformate 152. The NREF 330 may produce a separate hydrogen effluent 332. The NREF 330 may include a reformed effluent separation system (not shown) that may be operable to separate an effluent from the reforming reactor into the reformate 152 and the hydrogen effluent 332. The hydrogen effluent 332 may be recovered or may be recycled back to the NHT 320 as at least a portion of the hydrogen 322.

The hydrotreated naphtha 324 may be passed to the NREF 330 to improve its quality, such as by increasing the octane number to produce the reformate 152 that can be used as the feedstock for the ARC 150. The NREF 330 may be a catalytic reforming process. In catalytic reforming processes, paraffins and naphthenes are restructured to produce isomerized paraffins and aromatics of relatively higher octane numbers. Catalytic reforming can convert low octane n-paraffins to i-paraffins and naphthenes. Naphthenes can then be converted to higher octane aromatic compounds. The aromatic compounds present in the hydrotreated naphtha 324 can remain unchanged or at least a portion of aromatic compounds from the hydrotreated naphtha 324 may be hydrogenated to form naphthenes by reverse reactions taking place in the presence of hydrogen. The hydrogen may be generated during reforming of other constituents in the reforming unit and may be present in the reaction mixture.

The chemical reactions involved in catalytic reforming can be grouped into four categories, which include cracking, dehydrocyclization, dehydrogenation, and isomerization. A particular hydrocarbon molecule of the hydrotreated naphtha 324 may undergo one or more than one category of reaction during the reforming process to form one or a plurality of different molecules or products. The reforming unit of the NREF 330 may contact the hydrotreated naphtha 324 with a reforming catalyst under operating conditions sufficient to cause at least a portion of the hydrotreated naphtha 324 to undergo one or more reactions to produce a reforming effluent, which may then be separated into the reformate 152 and the hydrogen effluent 322. The reforming unit of the NREF 330 may be operated at a temperature of from 400° C. to 560° C., a pressure of from 100 kilopascals (kPa) to 5,000 kPa (from 1 bar to 50 bar, and a liquid hourly space velocity (LHSV) of from 0.5 per hour ($hr^{-1}$) to 4 $h^{-1}$.

The reforming catalysts for catalytic reforming processes in the NREF 330 can be either mono-functional or bi-functional reforming catalysts, which can contain precious metals, such as one or more metals from Groups 8-10 of the IUPAC periodic table, as active components (Group VIIIB in the Chemical Abstracts Services (CAS) system). The metals may be supported on a catalyst support, such as but not limited to an alumina, silica, titania, or combination of these supports. The reforming catalyst can be a bi-functional catalyst that has both metal sites and acidic sites. In embodiments, the reforming catalyst may be a platinum or palladium supported on an alumina support. The composition of the hydrotreated naphtha 324, the impurities present in the hydrotreated naphtha 324, and the desired products in the reformate 152 may influence the selection of reforming catalyst, reforming process type, and operating conditions. Types of chemical reactions can be targeted by a selection of catalyst or operating conditions known to those of ordinary skill in the art to influence both the yield and selectivity of conversion of paraffinic and naphthenic hydrocarbon precursors to particular aromatic hydrocarbon structures.

The reforming reactor of the NREF 330 may be any one of several types of catalytic reforming process configurations, which differ in the manner in which they regenerate the reforming catalyst to remove the coke formed during the reforming process. Catalyst regeneration, which involves combusting detrimental coke in the presence of oxygen, can include a semi-regenerative process, a cyclic regeneration process, or continuous regeneration process. Semi-regeneration is the simplest configuration, and the entire unit, including all reactors in the series, are shut-down for catalyst regeneration in all reactors. Cyclic configurations utilize an additional "swing" reactor to permit one reactor at a time to be taken off-line for regeneration while the others remain in service. Continuous catalyst regeneration configurations, which are the most complex, provide for continuous operation by catalyst removal, regeneration and replacement. While continuous catalyst regeneration configurations may enable the severity of the operating conditions to be increased due to higher catalyst activity, the associated capital investment is necessarily higher.

At least a portion of the reformate 152 may be passed to the ARC 150. In some embodiments, at least a portion of the reformate 152 may be sent to the gasoline pool (not shown). Referring again to FIG. 5, the ARC 150 may be disposed downstream of the NREF 330. The ARC 150 may be in fluid communication with the NREF 330 to receive all or at least a portion of the reformate 152 from the NREF 330. As previously discussed, the ARC 150 processes the reformate 152 to produce at least one aromatic product effluent 154 and the aromatic bottoms stream 156. The ARC 150 may be operable to separate the reformate 152 into the aromatic product effluent 154, a gasoline pool stream 158, and the aromatic bottoms stream 156.

Processes disclosed herein may include producing the aromatic bottoms stream 156. Producing the aromatic bottoms stream 156 may include passing a naphtha stream (naphtha stream 314, hydrotreated naphtha stream 324, naphtha recycle stream 188, other naphtha stream, or combinations of these) to the NREF 330 that reforms at least a portion of the hydrocarbons in the naphtha stream to produce a reformate 152. The reformate 152 may then be passed to the ARC 150 that processes the reformate 152 to produce at least one aromatic product effluent 154 and the aromatic bottoms stream 156. At least a portion of or all of the aromatic bottoms stream 156 may then be passed to the FCC unit 110. In embodiments, producing the aromatic bottoms stream 156 may further include passing a crude oil stream 302 or other heavy oil stream to the distillation system 310 that separates the crude oil stream 302 or other heavy oil into at least the naphtha stream 314 and the residue 318. The process may further include passing the naphtha stream 314 to the naphtha hydrotreating unit 320 that hydrotreats the naphtha stream 314 to produce a hydrotreated naphtha 324, and then passing the hydrotreated naphtha 324 to the NREF 330.

In embodiments, the hydrocarbon feed 102 may be hydroprocessed upstream of the FCC unit 110. Hydroprocessing the hydrocarbon feed 102 may remove constituents, such as heavy metals, sulfur compounds, and nitrogen compounds that may reduce the catalytic activity of the FCC catalysts in the FCC unit 110. Referring again to FIG. 5, the system 100 may include a hydroprocessing unit 170 upstream of the FCC unit 110. The hydrocarbon feed 102 may be passed to the hydroprocessing unit 170 along with hydrogen 172. The hydrogen 172 may be passed independently to the hydroprocessing unit 170 or may be combined with the hydrocarbon feed 102 upstream of the hydroprocessing unit 170. The hydrogen 172 may be supplied from a hydrogen source outside of the system 100, such as a feed hydrogen stream, or may be supplied from a hydrogen recovered from the system 100, such as but limited to the hydrogen effluent 332 recovered from the NREF 330. The volumetric ratio of hydrogen 172 to hydrocarbon feed 102 introduced to the hydroprocessing unit 170 may be from 400:1 to 1500:1, from 600:1 to 1300:1, from 800:1 to 1100:1, or even from 900:1 to 1000:1. In embodiments, hydroprocessing unit 170 may include multiple reactors, in such embodiments each reactor may be supplied with hydrogen 172 independently.

The hydroprocessing unit 170 may be operable to contact the hydrocarbon feed 102 with the hydrogen 172 in the presence of at least one hydroprocessing catalyst 173, which may include a hydrotreating catalyst, a hydrocracking catalyst, or both. The contacting may cause the hydrocarbon feed 102 and hydrogen 172 to undergo reactions that at least partially reduce the content of metals, sulfur, nitrogen, or combinations of these in the hydrocarbon feed 102 to produce a hydroprocessed effluent 174. Contacting with the hydroprocessing catalysts in the hydroprocessing unit 170 may also saturate aromatic compounds to produce naphthenic compounds. The hydroprocessed effluent 174 may have a content of one or more of metals, sulfur, nitrogen, or combinations of these that is less than a content of the one or more of metals, nitrogen, sulfur, or aromatic compounds of the hydrocarbon feed 102 by at least 2 percent (%), at least 5%, at least 10%, at least 25%, at least 50%, at least 75%, at least 90%, or even at least 95%. In embodiments, the hydroprocessed effluent 174 may have a content of contaminant metals that is less than 1 ppmw, less than 0.1 ppmw, or even less than 0.05 ppmw. In embodiments, the hydroprocessed effluent 174 may have a content of sulfur that is less than 1,000 ppmw.

In embodiments, the hydroprocessing catalyst 173 may include a hydrotreating catalyst, such as but not limited to a hydrodemetalization (HDM) catalyst that removes at least a portion of one or more metals from the hydrocarbon feed 102, a hydrodesulfurization (HDS) catalyst that removes at least a portion of the sulfur from the hydrocarbon feed, or both. Additionally, in embodiments, the hydroprocessing catalyst 173 may include a hydrodearomatization (HDA) catalyst that reduces the amount of aromatic compounds in the hydrocarbon feed 102 by saturating the aromatic rings to produce naphthenic compounds. The hydroprocessing unit 170 may also optionally be operable to reduce the concentration of nitrogen in the hydrocarbon feed 102, the nitrogen being reduced by one or more of the HDM, HDS, or HDA catalyst or by an optional hydrodenitrogenation (HDN) catalyst incorporated into the hydroprocessing unit 170. In embodiments, the hydroprocessing catalyst 173 may comprise a hydrocracking catalyst.

According to one or more embodiments, the hydroprocessing unit 170 may include multiple catalyst beds arranged in series. In embodiments, the hydroprocessing unit 170 may comprise an HDM catalyst, an HDS catalyst, and an HDN catalyst, arranged in series. The hydroprocessing catalysts 173 may comprise one or more metal catalysts selected from the metallic elements in Groups 5, 6, 8, 9, or 10 of the International Union of Pure and Applied Chemistry (IUPAC) periodic table, such as, but not limited to, molybdenum, nickel, cobalt, and tungsten. The metals of the hydroprocessing catalysts 173 may be supported on a support, such as but not limited to silica, alumina, or silica and alumina supports. The hydroprocessing catalyst 173 is not particularly limited and any commercially-available hydrotreating or hydrocracking catalysts may be suitable. The hydroprocessing unit 170 may be operated at a temperature of from 300° C. to 450° C. and at a pressure of from 30 bars (3,000 kilopascals (kPa)) to 200 bars (20,000 kPa), such as from 30 bars (3,000 kPa) to 180 bars (18,000 kPa). The hydrotreating unit 170 may operate with a liquid hour space velocity (LHSV) of from 0.1 per hour ($hr^{-1}$) to 10 $hr^{-1}$, such as from 0.2 $hr^{-1}$ to 10 $hr^{-1}$.

Referring to FIG. 5, the hydroprocessed effluent 174 is passed out of the hydroprocessing unit 170. The hydroprocessed effluent 174 may be passed to a hydroprocessed effluent separation system 175 that may be operable to separate the hydroprocessed effluent 174 into a light gas stream 176 and an upgraded hydrocarbon feed 178. The light gas stream 176 may include excess hydrogen from the hydroprocessing unit 170 as well as gases produced in the hydroprocessing unit 170, such as but not limited to hydrogen sulfide, ammonia, methane, or other light gases. The upgraded hydrocarbon feed 178 may have a density less than the density of the hydrocarbon feed 102, such as a density of from 0.80 grams per milliliter (g/mL) to 0.95 g/mL. The upgraded hydrocarbon feed 178 may have an API gravity less than the API gravity of the hydrocarbon feed 102, such as having an API gravity of less than or equal to 50 degrees, such as less than or equal to 40 degrees, from 25 degrees to 50 degrees, or from 25 degrees to 40 degrees.

The upgraded hydrocarbon feed 178 may have a sulfur content less than a sulfur content of the hydrocarbon feed 102 introduced to the hydroprocessing unit 170, such as a sulfur content of less than 1000 parts per million by weight (ppmw), less than or equal to 800 ppmw, less than or equal to 700 ppmw, or even less than or equal to 500 ppmw based on the total flow rate of the upgraded hydrocarbon feed 178. The upgraded hydrocarbon feed 178 may have a nitrogen content less than the nitrogen content of the hydrocarbon feed 102, such as a nitrogen content of less than or equal to 500 ppmw, less than or equal to 400 ppmw, or less than or equal to 300 ppmw based on the total flow rate of the upgraded hydrocarbon feed 178. The upgraded hydrocarbon feed 178 may have a metals content less than the metals content of the hydrocarbon feed 102 introduced to the hydroprocessing unit 170. In embodiments, the upgraded hydrocarbon feed 178 may have a metals content of less than or equal to 100 ppmw, less than or equal to 75 ppmw, less than or equal to 50 ppmw, less than or equal to 25 ppmw, or even less than or equal to 10 ppmw. Examples of heavy metals removed in the hydroprocessing unit 170 may include but are not limited to nickel, arsenic, vanadium, or other heavy metals.

In embodiments, the upgraded hydrocarbon feed 178 may have an aromatics content that is less than the aromatics content of the hydrocarbon feed 102. In embodiments, the upgraded hydrocarbon feed 178 may have an aromatics content that is reduced by at least 30 wt. %, at least 50 wt. %, at least 70 wt. %, at least 90 wt. %, or even at least 99 wt. % compared to the hydrocarbon feed 102. The upgraded hydrocarbon feed 178 may have an asphaltene content less than the hydrocarbon feed 102, such as an asphaltene content of from 0.01 wt. % to 1 wt. %. The upgraded hydrocarbon feed 178 may have an MCR content less than an MCR content of the hydrocarbon feed 102, such as an MCR content of less than or equal to 3 wt. %, less than or equal to 2.5 wt. %, less than or equal to 2.0 wt. %, less than or equal to 1.5 wt. %, or even less than or equal to 1.0 wt. %.

The upgraded hydrocarbon feed 178 may be passed from the hydroprocessed effluent separation system 175 to the FCC unit 110. In some embodiments, the upgraded hydrocarbon feed 178 may be passed directly from the hydroprocessed effluent separation system 175 to the FCC unit 110 without subjecting the upgraded hydrocarbon feed 178 to an intervening unit operation, such as a separation, that changes the composition of the upgraded hydrocarbon feed 178. In embodiments, the entire upgraded hydrocarbon feed 178 may be passed to the FCC unit 110. In embodiments, one or more slip streams having the same composition as the upgraded hydrocarbon feed 178 may be removed from the system 100 between the hydroprocessing unit 170 and the FCC unit 110 without changing the composition of the upgraded hydrocarbon feed 178.

Figure 6:
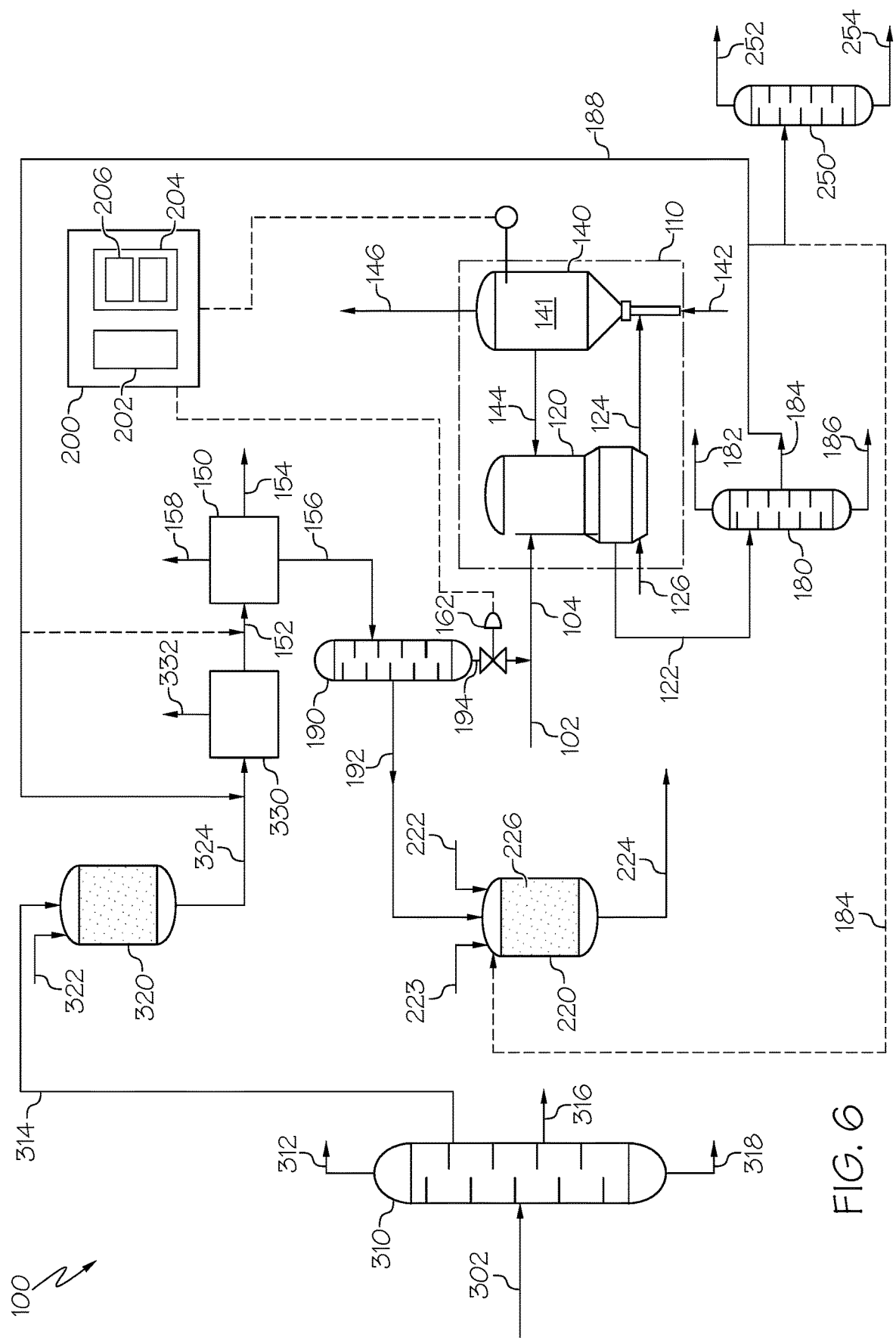
FIG. 6 schematically depicts a generalized flow diagram of still another system for upgrading a hydrocarbon feed, according to one or more embodiments shown and described in this disclosure.

Referring now to FIG. 6, in embodiments, the system 100 may include an FCC separation unit 180 disposed downstream of the FCC reactor 120. The FCC reactor 120 may be in fluid communication with the FCC separation unit 180 to pass the FCC effluent 122 from the FCC reactor 120 to the FCC separation unit 180. The FCC separation unit 180 may be in fluid communication with the FCC reactor 120 of the FCC unit 110 and may receive all or at least a portion of the FCC effluent 122. The FCC separation unit 180 may include one or a plurality of separation units. In embodiments, the FCC separation unit 180 may include one or more distillation columns for separating the FCC effluent 122 through distillation. The FCC separation unit 180 may be operable to separate the FCC effluent 122 into one or more constituent streams, such as but not limited to an olefin stream 182, an FCC naphtha stream 184, one or more cycle oils 186, light gas stream (not shown), or combinations of these.

The light gas stream (not shown) may comprise light gases, such as hydrogen, methane, and any other light gases. The light gas stream may include at least 80%, at least 90%, at least 95%, at least 98%, or even at least 99% of the light gases from the FCC effluent 122. The light gas stream may be passed out of the system and may be processed downstream to recover one or more of hydrogen or methane. The olefin stream 182 may comprise $C_2$-$C_4$ olefins, such as ethylene, propene, mixed butenes (1-butene, isobutene, trans-2-butene, cis-2-butene), or combinations of these. The olefin stream 182 may include at least 80%, at least 90%, at least 95%, at least 98%, or even at least 99% of the ethylene, propene, and butenes from the FCC effluent 122. The olefin stream 182 may be passed out of the system as an olefin product stream. In embodiments, the olefin stream 182 may be passed to one or more downstream unit operations for further processing of the olefin stream 182.

The FCC naphtha stream 184 may comprise constituents of the FCC effluent 122 having an atmospheric boiling point temperature of between 36° C. to 180° C. The FCC naphtha stream 184 may include at least 80%, at least 90%, at least 95%, at least 98%, or at least 99% by weight of the constituents of the FCC effluent 122 having an atmospheric boiling point temperature of between 36° C. to 180° C. The FCC naphtha stream 184 may include aromatic compounds and gasoline blending components produced in the FCC unit 110. The FCC naphtha stream 184 may also include constituents of the FCC feed 104 not converted in the FCC unit 110. The cycle oil stream 186 may include constituents from the FCC effluent 122 having boiling point temperatures greater than or equal to 180° C.

In embodiments, the FCC naphtha stream 184 may be passed out of the system 100 as a product stream. Referring again to FIG. 6, in embodiments, at least a portion of or all of the FCC naphtha stream 184 may be passed back to the NREF 330, the ARC 150, or both via the naphtha recycle stream 188. In embodiments, at least a portion of or all of the FCC naphtha stream 184 may be further separated in an FCC naphtha separator 250 to produce an FCC aromatic product stream 252 and an FCC gasoline pool stream 254. The system 100 may further include the FCC naphtha separator 250 operable to separate the FCC naphtha stream 184 to produce a plurality of product streams, such as the FCC aromatic product stream 252 and the FCC gasoline pool stream 254. The FCC aromatic product stream 252 may include benzene, toluene, xylenes, or combinations of these.

Referring again to FIG. 6, the aromatic bottoms stream 156 can be a $C_{9+}$ aromatic compound stream, and the system 100 may further include an aromatic bottoms atmospheric distillation unit 190 disposed downstream of the ARC 150. The aromatic bottoms atmospheric distillation unit 190 may be in fluid communication with the ARC 150 to receive at least a portion of the aromatic bottoms stream 156 from the ARC 150. The aromatic bottoms atmospheric distillation unit 190 may be operable to separate at least a portion of the aromatic bottoms stream 156 to produce at least a lesser boiling effluent 192 and a greater boiling aromatic bottoms effluent 194. The lesser boiling point effluent 192 may include constituents of the aromatic bottoms stream 156 having boiling point temperatures less than or equal to a cut point temperature of the aromatic bottoms atmospheric distillation unit 190, such as less than or equal to 180° C. The lesser boiling effluent 192 may be a gasoline pool stream and may include $C_9$ aromatic compounds, $C_{10}$ aromatic compounds, or both. The lesser boiling effluent 192 may include constituents of the aromatic bottoms steam 156 having atmospheric boiling point temperatures less than or equal to 180° C.

The greater boiling aromatic bottoms effluent 194 may include constituents of the aromatic bottoms stream 156 having atmospheric boiling point temperatures greater than the cut point temperature of the aromatic bottoms atmospheric distillation unit 190, such as greater than 180° C. The greater boiling aromatic bottoms effluent 194 may include the $C_{11+}$ aromatic compounds. The greater boiling aromatic bottoms effluent 194 may include greater than 90%, greater than 95%, greater than 98%, or even greater than 99% by weight of the $C_{11+}$ aromatic compounds from the portion of the aromatic bottoms stream 156 passed to the aromatic bottoms atmospheric distillation unit 190.

The aromatic bottoms atmospheric distillation unit 190 may be in fluid communication with the FCC unit 110 to pass the greater boiling aromatic bottoms effluent 194 from the aromatic bottoms atmospheric distillation unit 190 to the FCC unit 110. The greater boiling aromatic bottoms effluent 194 may comprise the portion of the aromatic bottoms passed to the FCC unit 110 to increase the amount of coke produced in the FCC reactor 120. The greater boiling aromatic bottoms effluent 194 may be combined with the hydrocarbon feed 102 or upgraded hydrocarbon feed 178 upstream of the FCC unit 110 to produce the FCC feed 104.

Referring again to FIG. 6, the system may further include a transalkylation unit 220, which is disposed downstream of the aromatic bottoms atmospheric distillation unit 190. The transalkylation unit 220 may be in fluid communication with the aromatic bottoms atmospheric distillation unit 190 to pass the lesser boiling fraction 192 from the aromatic bottoms atmospheric distillation unit 190 to the transalkylation unit 220. Hydrogen may also be passed to the transalkylation unit 220 through hydrogen feed 222. Toluene 223 can also be introduced to the transalkylation unit 220. The transalkylation unit 220 may be operable to contact the lesser boiling fraction 192 with hydrogen and toluene in the presence of a transalkylation catalyst under reaction conditions sufficient to cause at least a portion of the toluene and the $C_9$ aromatic compounds or $C_9$-$C_{10}$ aromatic compounds to undergo transalkylation reactions to produce $C_8$ aromatic compounds, such as mixed xylenes, benzene, or both.

The transalkylation unit 220 may include one or a plurality of reactors in parallel or in series. The transalkylation unit 220 may include a transalkylation catalyst disposed in a transalkylation zone 226. The transalkylation zone 226 may have an inlet in fluid communication with the aromatic bottoms atmospheric distillation unit 190 for passing the lesser boiling fraction 192 to the transalkylation unit 220. The transalkylation zone 226 may also have an outlet for passing the transalkylation effluent 224 out of the transalkylation zone 226. The transalkylation effluent 224 may be passed out of the transalkylation unit 220. The transalkylation effluent 224 may include the $C_8$ aromatic compounds, benzene, toluene, or combinations of these produced in the transalkylation unit 220 as well as unreacted hydrogen and any unreacted $C_9$ and $C_{10}$ hydrocarbons from the lesser boiling fraction 192.

In embodiments, the transalkylation unit 220 may be in fluid communication with the FCC separation unit 180 to pass the FCC naphtha stream 184 from the FCC separation unit 180 to the transalkylation unit 220. The transalkylation unit 220 may be operable to contact the FCC naphtha stream 184 with hydrogen and toluene in the presence of the transalkylation catalyst in the transalkylation zone 226, which may cause at least a portion of the FCC naphtha stream 184 to undergo transalkylation reactions to produce additional $C_8$ aromatic compounds, benzene, toluene, or combinations of these.

Referring to FIG. 1, as previously discussed, the system controller 200 may include one or more processors 202 and one or more memory modules 204. The one or more processors 202 may include any device capable of executing computer-readable executable instructions stored on a non-transitory computer-readable medium. Accordingly, each processor 202 may include an integrated circuit, a microchip, a computer, and/or any other computing device. The one or more memory modules 204 are communicatively coupled to the one or more processors 202 over a communication path. The one or more memory modules 204 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory modules 204 may be configured to store machine readable and executable instructions 206 for operating one or more components of the system 100.

Embodiments of the present disclosure include logic stored on the one or more memory modules 204 that includes machine-readable and executable instructions or an algorithm written in any programming language of any generation (e.g., 1GL, 2GL, 3GL, 4GL, and/or 5GL) such as, machine language that may be directly executed by the one or more processors 202, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

EXAMPLES

The various embodiments of methods and systems for the processing of heavy oils will be further clarified by the following examples. The examples are illustrative in nature, and should not be understood to limit the subject matter of the present disclosure.

Example 1: Composition of Aromatic Bottoms Stream

In Example 1, the composition of the aromatic bottoms stream produced from naphtha reforming and then processing of the reformate in the aromatics recovery complex (ARC) is investigated. In Example 2, a sample of the aromatics bottoms fraction from a production scale ARC used to process the reformate from a naphtha reforming process was obtained. A quantity of 15,000 kg of the aromatic bottoms stream was distilled using a lab scale true boiling point distillation column with 15 or more theoretical plates according to ASTM method D2917. The aromatics bottoms stream was separated into a gasoline fraction (lesser boiling fraction 192 in FIG. 6) boiling in the range 36-180° C. and a residue stream (greater boiling fraction 194) boiling above 180° C. 8,484 kg (56.56 W %) of the gasoline fraction and 6,516 kg of the residue stream were recovered. The gasoline fraction was analyzed for its content and octane numbers. The density, octane number (ASTM D2799), cetane index, and boiling point distribution for the aromatic bottoms stream, the gasoline fraction, and the residue stream for Example 1 are provided below in Table 1.

TABLE 1

| Property | Feedstock Aromatics Bottoms | Gasoline IBP-180° C. | Bottom Fraction 180+° C. |
| --- | --- | --- | --- |
| Density | 0.9125 | 0.873 | 0.9226 |
| Octane Number ASTM D2799 | — | 107 | — |
| Cetane Index | — | — | 16 |
| Initial Boiling Point (IBP) (° C.) | 182 | 153 | 164 |
| 5 W % (° C.) | 183 | 161 | 182 |
| 10 W % (° C.) | 183 | 162 | 184 |
| 30 W % (° C.) | 184 | 163 | 197 |
| 50 W % (° C.) | 208 | 169 | 222 |
| 70 W % (° C.) | 302 | 171 | 322 |
| 90 W % (° C.) | 330 | 184 | 340 |
| 95 W % (° C.) | 337 | 184 | 346 |
| Final Boiling Point (FBP) (° C.) | 350 | 251 | 455 |
| Paraffins | 1.00 | | |
| Mono Aromatic Compounds (wt. %) | 74.60 | | |
| Naphtheno Mono Aromatics (wt. %) | 3.06 | | |
| Diaromatic Compounds (wt. %) | 15.36 | | |
| Naphtheno Di Aromatics (wt. %) | 5.21 | | |
| Tri Aromatic Compounds (wt. %) | 0.59 | | |
| Tetra Aromatic Compounds (wt. %) | 0.18 | | |

Examples 2-6: Passing the Aromatic Bottoms Stream to an FCC Unit

In Examples 2-6, the impact of passing a portion of the aromatic bottoms stream to an FCC unit for catalytically cracking a hydrocarbon feed was investigated. The portion of the aromatic bottoms stream for Examples 2-6 was the residue (greater boiling fraction 194) from Example 1. The hydrocarbon feed for Examples 2-6 is a typical feed for an FCC unit having the boiling point distribution and properties provided in Table 2.

TABLE 2

| Property | Value | Units |
| --- | --- | --- |
| Density @ 15.6 °C (ASTM D-4052) | 0.8164 | grams/cc |
| Nitrogen ASTM D-4629 | <1 | ppmw |
| SULFUR ASTM D-5453 | 70 | ppmw |
| Distillation ASTM D2887 | | |
| 0% | 183 | °C. |
| 5% | 411 | °C. |
| 10% | 437 | °C. |
| 20% | 458 | °C. |
| 30% | 473 | °C. |
| 40% | 486 | °C. |
| 50% | 499 | °C. |
| 60% | 516 | °C. |
| 70% | 534 | °C. |
| 80% | 555 | °C. |
| 90% | 583 | °C. |
| 95% | 601 | °C. |
| 100% | 635 | °C. |
| RECOVERED % | 100 | |
| Microcarbon Residue (MCR) ASTM D-4530 | <10 | wt. % |
| Hydrogen content | 15.25 | wt. % |

For Examples 2 and 3, the FCC feed was subjected to catalytic cracking using a Micro Activity Test (MAT) unit. The MAT tests were conducted in a fixed-bed reactor according to ASTM Standard Test Method D51549 "Determining Activity and Selectivity of FCC Catalysts by Microactivity Test." A proprietary FCC catalyst based on USY zeolite was used for the tests. The catalyst was conditioned using the ASTM D4463 method "Metals Free Steam Deactivation of Fresh Fluid Cracking Catalyst." According to this method, the catalysts were aged at 810° C. and ambient pressure under a flow of 100% steam for 6 hours. Example 2 was a comparative example. In Example 2, the FCC feed comprised 100 wt. % of the hydrocarbon feed composition in Table 2 and no bottoms fraction from Example 1. For Example 3, the FCC feed comprises 100 wt. % bottoms fraction of the aromatic bottoms stream from Example 1 and none of the hydrocarbon feed from Table 2. The reaction temperature and catalyst to oil ratio for Examples 2 and 3 are provided in Table 3. Following the reaction, the FCC effluent was analyzed to determine the amount of light gases, C2-C4 olefins, FCC gasoline, and cycle oil produced. The catalyst was analyzed to determine the amount of coke made in the FCC unit. The amount of each portion of the FCC effluent and the amount of coke produced are provided in Table 3.

After the experiments were conducted for Examples 2 and 3, simulations were conducted for FCC feeds that included the hydrocarbon feed from Table 2 with the addition of 5 wt. %, 10 wt. %, and 15 wt. % of the bottom fraction of the aromatic bottoms stream for Examples 4, 5, and 6, respectively. Table 3 summarizes the composition of the FCC effluent and amount of coke produced in the simulations for Examples 4-6.

TABLE 3

| Mass Balance for Examples 2-6 in Kg | | | | | |
| --- | --- | --- | --- | --- | --- |
| | 2 | 3 | 4 | 5 | 6 |
| | Type | | | | |
| | Comparative Example | Example | Example | Example | Example |
| Experiment (E)/Simulation (S) | E | E | S | S | S |
| Aromatic bottoms in Feedstock, W % | 0 | 100 | 5 | 10 | 15 |
| FCC Temperature (° C.) | 515 | 515 | 515 | 515 | 515 |
| Catalyst to Oil Ratio | 5.9:1 | 5.9:1 | 5.9:1 | 5.9:1 | 5.9:1 |
| Total Feed (kg) | 6,516 | 6,516 | 6,516 | 6,516 | 6,516 |
| C2-C4 Olefins (kg) | 2,438 | 314 | 2,332 | 2,226 | 2,120 |
| Light Gases (kg) | 1,097 | 225 | 1,054 | 1,010 | 966 |
| FCC Gasoline (kg) | 1,882 | 4,042 | 1,990 | 2,098 | 2,206 |
| Cycle Oil (kg) | 972 | 1,706 | 1,009 | 1,045 | 1,082 |
| Coke (kg) | 126 | 228 | 132 | 137 | 142 |
| Total (kg) | 6,516 | 6,515 | 6,516 | 6,516 | 6,516 |

As shown by the data in Table 3, the bottoms fraction obtained from the aromatic bottoms stream increases the coke make substantially. In particular, the coke yield is 810% more when bottoms of the aromatic bottoms stream is processed compared to 100% FCC feedstock. When the bottoms of the aromatic bottoms stream is processed together with a hydrogen-rich FCC feedstock, an increase in coke make is observed. The increase in coke make is sufficient to meet the refinery demand for heat.

Additionally, Examples 4-6 show that the inclusion of a portion of the aromatic bottoms stream in the feed to the FCC unit increases the production of high-quality FCC gasoline compared to cracking the hydrogen-rich hydrocarbon feed by itself.

The FCC effluent from Example 3 (bottom fraction produced from the aromatic bottoms stream) was further analyzed through gas chromatography (GC) to determine the amount of additional aromatic compounds produced. The GC results are provided below in Table 4. As shown in Table 4, substantial amounts of benzene, toluene, xylenes, and ethylbenzene, in particular xylenes and ethylbenzene, are produced by fluid catalytic cracking of the bottom fraction produced from the aromatic bottoms stream.

TABLE 4

| Component | FCC Feed wt. % | FCC Effluent wt. % |
| --- | --- | --- |
| Benzene | 0.00 | 0.42 |
| Toluene | 0.04 | 2.97 |
| Xylenes, ethylbenzene | 0.35 | 23.62 |

A first aspect of the present disclosure is directed to a process for upgrading a hydrocarbon feed. The process comprises passing the hydrocarbon feed and an aromatic bottoms stream to a fluidized catalytic cracking (FCC) unit comprising an FCC reactor and a catalyst regenerator. The hydrocarbon feed can be a hydrogen-rich hydrocarbon feed comprising greater than or equal to 12 wt. % hydrogen on an elemental basis, and the aromatic bottoms stream is a bottoms stream produced from an aromatics recovery complex. The process further includes contacting the hydrocarbon feed and the aromatic bottoms stream with an FCC catalyst, an FCC cracking additive, or both at a reaction temperature of from 480° C. to 650° C. in the FCC reactor, where the contacting produces a spent FCC catalyst and an FCC effluent comprising one or more products. The spent FCC catalyst can comprise coke deposits produced through reaction of the hydrocarbon feed and aromatic bottoms stream in the FCC reactor. The process further includes separating the FCC effluent from the spent FCC catalyst and regenerating the spent FCC catalyst in the catalyst regenerator. Regenerating the spent FCC catalyst comprises combusting the coke deposits on the spent FCC catalyst to produce a regenerated FCC catalyst. Catalytic cracking the aromatic bottoms stream in the FCC reactor can increase the coke deposits to an amount that, when combusted, heats the regenerated FCC catalyst to a temperature greater than or equal to the reaction temperature of the FCC reactor.

A second aspect of the present disclosure may include the first aspect, where the aromatic bottoms stream can comprise from 1 weight percent to 40 weight percent of total hydrocarbons passed to the FCC unit, where the total hydrocarbons passed to the FCC unit is equal to the aromatic bottoms stream plus the hydrocarbon feedstock.

A third aspect of the present disclosure may include either one of the first or second aspects, where the coke deposits can comprise a first amount of coke produced through catalytic cracking of the hydrocarbon feed and a second amount of coke produce through catalytic cracking of the aromatic bottoms stream. The second amount of coke per unit weight of the aromatic bottoms stream passed to the FCC unit can be at least 40% greater than the first amount of coke per unit weight of the hydrocarbon feed passed to the FCC unit.

A fourth aspect of the present disclosure may include any one of the first through third aspects, further comprising determining one or more operating parameters of the FCC unit and controlling a flow rate of the aromatic bottoms stream to the FCC unit based on the determination of the one or more operating parameters. Controlling the flow rate of the aromatic bottoms stream to the FCC unit can control an amount of the coke deposits produced in the FCC reactor.

A fifth aspect of the present disclosure may include any one of the first through fourth aspects, where the aromatic bottoms stream can comprise at least 50 weight percent $C_{9+}$ aromatic compounds.

A sixth aspect of the present disclosure may include any one of the first through fifth aspects, where the aromatic bottoms stream can comprise greater than 50 weight percent constituents having atmospheric boiling point temperatures greater than or equal to 150° C.

A seventh aspect of the present disclosure may include any one of the first through sixth aspects, further comprising passing the aromatics bottoms stream to an aromatic bottoms atmospheric distillation unit that separates the aromatics bottoms stream into a lesser boiling effluent and a greater boiling aromatic bottoms effluent, and passing the greater boiling aromatic bottoms effluent to the FCC unit.

An eighth aspect of the present disclosure may include the seventh aspect, where the greater boiling aromatic bottoms effluent can comprise greater than or equal to 90% of $C_{11+}$ aromatic compounds from the aromatic bottoms stream passed to the aromatic bottoms atmospheric distillation unit and the lesser boiling effluent can comprise at least 90% of $C_9$ aromatic compounds and $C_{10}$ aromatic compounds from the aromatic bottoms stream passed to the aromatic bottoms atmospheric distillation unit.

A ninth aspect of the present disclosure may include either one of the seventh or eighth aspects, further comprising passing the lesser boiling effluent to a transalkylation unit, and contacting the lesser boiling effluent with hydrogen and toluene in the presence of a transalkylation catalyst under reaction conditions sufficient to cause at least a portion of $C_9$ aromatic compounds and $C_{10}$ aromatic compounds in the lesser boiling effluent to undergo transalkylation to produce $C_8$ aromatic compounds, benzene, or a combination of these.

A tenth aspect of the present disclosure may include any one of the first through ninth aspects, further comprising passing a naphtha stream to a naphtha reforming unit that reforms hydrocarbons in the naphtha stream to produce a reformate, passing the reformate to the aromatics recovery complex that processes the reformate to produce at least one aromatic product effluent and the aromatic bottoms stream, and passing at least a portion of the aromatic bottoms stream to the FCC unit.

An eleventh aspect of the present disclosure may include the tenth aspect, further comprising passing a crude oil stream to a distillation system that separates the crude oil stream into at least the naphtha stream and a residue, passing the naphtha stream to a naphtha hydrotreating unit that hydrotreats the naphtha stream to produce a hydrotreated naphtha, and passing the hydrotreated naphtha to the naphtha reforming unit.

A twelfth aspect of the present disclosure may include either one of the tenth or eleventh aspects, further comprising passing the FCC effluent to an FCC separation unit that separates the FCC effluent into at least an FCC naphtha stream and one or more other streams, and passing the FCC naphtha stream back to the naphtha reforming unit, the aromatics recovery complex, or both.

A thirteenth aspect of the present disclosure may include any one of the first through twelfth aspects, further comprising passing the FCC effluent to an FCC separation unit that separates the FCC effluent into at least an olefin stream, an FCC naphtha stream, and one or more cycle oils, where the FCC naphtha stream comprises at least 80% by weight of the constituents of the FCC effluent having atmospheric boiling point temperatures of from 36° C. to 180° C.

A fourteenth aspect of the present disclosure may include the thirteenth aspect, further comprising passing at least a portion of the FCC naphtha stream back to a naphtha reforming unit, an aromatics recovery complex, or both.

A fifteenth aspect of the present disclosure may include either one of the thirteenth or fourteenth aspects, further comprising passing at least a portion of the FCC naphtha stream to an FCC naphtha separator that separates the FCC naphtha stream to produce an FCC aromatic product stream and an FCC gasoline pool stream, the FCC aromatic product stream comprising benzene, toluene, xylenes, or combinations thereof.

A sixteenth aspect of the present disclosure may include any one of the thirteenth through fifteenth aspects, further comprising passing at least a portion of the FCC naphtha stream to a transalkylation unit, and contacting the portion of the FCC naphtha stream with hydrogen and toluene in the presence of a transalkylation catalyst under reaction conditions that cause that at least a portion of the FCC naphtha stream to undergo transalkylation to produce $C_8$ aromatic compounds, benzene, or a combination of these.

A seventeenth aspect of the present disclosure may include any one of the first through sixteenth aspects, where the hydrocarbon feed can have a boiling point range of from 36° C. to 900° C.

An eighteenth aspect of the present disclosure may include any one of the first through seventeenth aspects, where the hydrocarbon feed can be selected from the group consisting of crude oil, synthetic crude oil, bitumen, oil sands, shale oil, coal liquids, straight run gas oil, vacuum gas oil, deasphalted oil from a solvent deasphalting process, demetalized oil from a solvent deasphalting process, light coker gas oil, heavy coker gas oil, cycle oil from an FCC process, gas oil from a visbreaking process, and combinations of these.

A nineteenth aspect of the present disclosure may include any one of the first through eighteenth aspects, where the hydrocarbon feed can be a vacuum gas oil.

A twentieth aspect of the present disclosure may include any one of the first through nineteenth aspects, further comprising passing the hydrocarbon feed to a hydroprocessing unit disposed upstream of the FCC unit, contacting the hydrocarbon feed with hydrogen in the presence of a hydroprocessing catalyst to produce an upgraded hydrocarbon feed, and passing the upgraded hydrocarbon feed to the FCC unit.

A twenty-first aspect of the present disclosure may include the twentieth aspect, where the hydroprocessing catalyst can include a hydrotreating catalyst, a hydrocracking catalyst, or both.

A twenty-second aspect of the present disclosure may include any one of the first through twenty-first aspects, where the FCC reactor can be a downer reactor and the process can comprise contacting the hydrocarbon feed and the aromatic bottoms stream with the FCC catalyst at a temperature of from 550° C. to 650° C., for a contact time in the FCC reactor of from 0.1 seconds to 30 seconds, and at a feed ratio of the FCC catalyst to total hydrocarbons of from 1:1 to 40:1, where the total hydrocarbons comprises the hydrocarbon feed and the aromatic bottoms stream.

A twenty-third aspect of the present disclosure may include any one of the first through twenty-first aspects, where the FCC reactor can be a riser reactor and the process can comprise contacting the hydrocarbon feed and the aromatic bottoms stream with the FCC catalyst at the reaction temperature of from 480° C. to 650° C., for a contact time in the FCC reactor of from 0.7 seconds to 10 seconds, and at a feed ratio of the FCC catalyst to total hydrocarbons of from 1:1 to 15:1, where the total hydrocarbons comprises the hydrocarbon feed and the aromatic bottoms stream.

A twenty-fourth aspect of the present disclosure may include any one of the first through twenty-third aspects, comprising contacting the hydrocarbon feed and the aromatic bottoms stream with the FCC catalyst at a pressure of from 1 kg/cm$^2$ to 20 kg/cm$^2$.

A twenty-fifth aspect of the present disclosure is directed to a system for upgrading a hydrocarbon feed, the system comprising a hydrocarbon feed comprising greater than or equal to 12 weight percent hydrogen based on the total weight of the hydrocarbon feed; an aromatic bottoms stream from an aromatics recovery complex, the aromatic bottoms stream comprising at least 50 weight percent $C_{9+}$ aromatic compounds based on the total weight of the aromatic bottoms stream; and a fluidized catalytic cracking (FCC) unit comprising at least one FCC reactor; an FCC catalyst, an FCC catalyst additive, or both circulated through the FCC unit; and at least one catalyst regenerator. The at least one FCC reactor is in fluid communication with the hydrocarbon feed to pass the hydrocarbon feed to the FCC reactor. The at least one FCC reactor is operable to contact the hydrocarbon feed and the aromatic bottoms stream with the FCC catalyst, the FCC catalyst additive, or both at operating conditions that cause at least a portion of hydrocarbons in the hydrocarbon feed and the aromatic bottoms stream to undergo catalytic cracking reactions to produce an FCC effluent and a spent FCC catalyst comprising coke deposits.

A twenty-sixth aspect of the present disclosure may include the twenty-fifth aspect, further comprising an aromatics recovery complex operable to process a reformate from naphtha reforming to produce one or more aromatic product streams and the aromatic bottoms stream, where the aromatics recovery complex is in fluid communication with the FCC unit to pass at least a portion of the aromatic bottoms stream to the FCC unit.

A twenty-seventh aspect of the present disclosure may include either one of the twenty-fifth or twenty-sixth aspects, further comprising an aromatic bottoms control valve disposed in an aromatic bottoms transfer line fluidly coupling the aromatics recovery complex to the FCC unit. The system can further include a system controller communicatively coupled to the aromatic bottoms control valve, the system controller comprising a processor, a memory module, and computer readable and executable instructions stored on the memory module. The computer readable and executable instructions, when executed by the processor, can cause the system controller to automatically control a position of the aromatic bottoms control valve to control a flow rate of the aromatic bottoms to the FCC unit.

A twenty-eighth aspect of the present disclosure may include the twenty-seventh aspect, where the computer readable and executable instructions, when executed by the processor, automatically cause the system controller to measure one or more operating parameters of the FCC unit, and control a position of the aromatic bottoms control valve based on the measured operating parameters of the FCC unit.

A twenty-ninth aspect of the present disclosure may include any one of the twenty-fifth through twenty-eighth aspects, further comprising a hydroprocessing unit disposed upstream of the FCC unit, where the hydroprocessing unit is operable to contact the hydrocarbon feed with hydrogen in the presence of at least one hydroprocessing catalyst to produce an upgraded hydrocarbon feed.

A thirtieth aspect of the present disclosure may include the twenty-ninth aspect, where the hydroprocessing unit is fluidly coupled to the FCC unit to pass the upgraded hydrocarbon feed directly from the hydroprocessing unit to the FCC unit.

A thirty-first aspect of the present disclosure may include any one of the twenty-fifth through thirtieth aspects, further comprising an aromatic bottoms atmospheric distillation unit disposed upstream of the FCC unit, where the aromatic bottoms atmospheric distillation unit is operable to receive the aromatic bottoms stream and separate the aromatic bottoms stream to produce a lesser boiling effluent and a greater boiling aromatic bottoms effluent.

A thirty-second aspect of the present disclosure may include the thirty-first aspect, where the aromatic bottoms atmospheric distillation unit is in fluid communication with the FCC unit to pass the greater boiling aromatic bottoms effluent directly from the aromatic bottoms atmospheric distillation unit to the FCC unit.

A thirty-third aspect of the present disclosure may include either one of the thirty-first or thirty-second aspects, further comprising a transalkylation unit in fluid communication with the aromatic bottoms atmospheric distillation unit, where the transalkylation unit is operable to receive the lesser boiling effluent from the aromatic bottoms atmospheric distillation unit and contact the lesser boiling effluent with hydrogen and toluene in the presence of a transalkylation catalyst under reaction conditions that cause at least a portion of $C_9$ aromatic compounds, $C_{10}$ aromatic compounds, or both in the lesser boiling effluent to undergo transalkylation to produce $C_8$ aromatic compounds, benzene, or a combination of these.

A thirty-fourth aspect of the present disclosure may include any one of the twenty-fifth through thirty-third aspects, further comprising an FCC separation unit disposed downstream from the FCC unit, the FCC separation unit being operable to separate the FCC effluent into at least an olefin stream, an FCC naphtha stream, and one or more cycle oils.

A thirty-fifth aspect of the present disclosure may include the thirty-fourth aspect, where the FCC separation unit is in fluid communication with a naphtha reforming unit, an aromatics recovery complex, or both to pass at least a portion of the FCC naphtha stream to the naphtha reforming unit, the aromatics recovery complex, or both.

A thirty-sixth aspect of the present disclosure may include the thirty-fourth aspect, further comprising FCC naphtha separator disposed downstream of the FCC separation unit, the FCC naphtha separator operable to separate the FCC naphtha stream into an FCC aromatic product stream and an FCC gasoline pool stream.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A process for upgrading a hydrocarbon feed, the process comprising:
    passing an aromatics bottoms stream to an aromatic bottoms atmospheric distillation unit that separates the aromatics bottoms stream into a lesser boiling effluent and a greater boiling aromatic bottoms effluent, where the aromatic bottoms stream is a bottoms stream produced from an aromatics recovery complex;
    passing the hydrocarbon feed and the greater boiling aromatic bottoms effluent to a fluidized catalytic cracking (FCC) unit comprising an FCC reactor and a catalyst regenerator, wherein:
        the hydrocarbon feed is a hydrogen-rich hydrocarbon feed comprising greater than or equal to 12 wt. % hydrogen on an elemental basis;
    contacting the hydrocarbon feed and the greater boiling aromatic bottoms effluent with an FCC catalyst, an FCC cracking additive, or both at a reaction temperature of from 480° C. to 650° C. in the FCC reactor, where:
        the contacting produces a spent FCC catalyst and an FCC effluent comprising one or more products;
        the spent FCC catalyst comprises coke deposits produced through reaction of the hydrocarbon feed and the greater boiling aromatic bottoms effluent in the FCC reactor;
    separating the FCC effluent from the spent FCC catalyst;
    regenerating the spent FCC catalyst in the catalyst regenerator, where:
        regenerating the spent FCC catalyst comprises combusting the coke deposits on the spent FCC catalyst to produce a regenerated FCC catalyst; and
        catalytic cracking the greater boiling aromatic bottoms effluent in the FCC reactor increases the coke deposits to an amount sufficient to heat the regenerated FCC catalyst to a temperature greater than or equal to the reaction temperature of the FCC reactor.

2. The process of claim 1, where the greater boiling aromatic bottoms effluent comprises from 1 weight percent to 40 weight percent of total hydrocarbons passed to the FCC unit, where the total hydrocarbons passed to the FCC unit is equal to the greater boiling aromatic bottoms effluent plus the hydrocarbon feedstock.

3. The process of claim 1, where:
    the coke deposits comprise a first amount of coke produced through catalytic cracking of the hydrocarbon feed and a second amount of coke produce through catalytic cracking of the greater boiling aromatic bottoms effluent; and
    the second amount of coke per unit weight of the greater boiling aromatic bottoms effluent passed to the FCC unit is at least 40% greater than the first amount of coke per unit weight of the hydrocarbon feed passed to the FCC unit.

4. The process of claim 1, further comprising:
    determining one or more operating parameters of the FCC unit; and
    controlling a flow rate of the greater boiling aromatic bottoms effluent to the FCC unit based on the determination of the one or more operating parameters, where controlling the flow rate of the greater boiling aromatic bottoms effluent to the FCC unit controls an amount of the coke deposits produced in the FCC reactor.

5. The process of claim 1, where the aromatic bottoms stream comprises at least 50 weight percent $C_{9+}$ aromatic compounds.

6. The process of claim 1, where the aromatic bottoms stream comprises greater than 50 weight percent constituents having atmospheric boiling point temperatures greater than or equal to 150° C.

7. The process of claim 1, where the greater boiling aromatic bottoms effluent comprises greater than or equal to 90% of $C_{11+}$ aromatic compounds from the aromatic bottoms stream passed to the aromatic bottoms atmospheric distillation unit and the lesser boiling effluent comprises at least 90% of $C_9$ aromatic compounds and $C_{10}$ aromatic compounds from the aromatic bottoms stream passed to the aromatic bottoms atmospheric distillation unit.

8. The process of claim 1, further comprising:
    passing the lesser boiling effluent to a transalkylation unit; and
    contacting the lesser boiling effluent with hydrogen and toluene in the presence of a transalkylation catalyst under reaction conditions sufficient to cause at least a portion of $C_9$ aromatic compounds, $C_{10}$ aromatic compounds, or both in the lesser boiling effluent to undergo transalkylation to produce $C_8$ aromatic compounds, benzene, or a combination of these.

9. The process of claim 1, further comprising passing the FCC effluent to an FCC separation unit that separates the FCC effluent into at least an olefin stream, an FCC naphtha stream, and one or more cycle oils, where the FCC naphtha stream comprises at least 80% by weight of the constituents of the FCC effluent having atmospheric boiling point temperatures of from 36° C. to 180° C.

10. The process of claim 9, further comprising passing at least a portion of the FCC naphtha stream back to a naphtha reforming unit, an aromatics recovery complex, or both.

11. The process of claim 9, further comprising passing at least a portion of the FCC naphtha stream to an FCC naphtha separator that separates the FCC naphtha stream to produce an FCC aromatic product stream and an FCC gasoline pool stream, the FCC aromatic product stream comprising benzene, toluene, xylenes, or combinations thereof.

12. The process of claim 9, further comprising:
passing at least a portion of the FCC naphtha stream to a transalkylation unit; and
contacting the portion of the FCC naphtha stream with hydrogen and toluene in the presence of a transalkylation catalyst under reaction conditions that cause that at least a portion of the FCC naphtha stream to undergo transalkylation to produce $C_8$ aromatic compounds, benzene, or a combination of these.

13. The process of claim 1, where the hydrocarbon feed has a boiling point range of from 36° C. to 900° C.

14. The process of claim 1, further comprising:
passing the hydrocarbon feed to a hydroprocessing unit disposed upstream of the FCC unit;
contacting the hydrocarbon feed with hydrogen in the presence of a hydroprocessing catalyst to produce an upgraded hydrocarbon feed; and
passing the upgraded hydrocarbon feed to the FCC unit.

15. The process of claim 1, where:
the FCC reactor is a downer reactor and the process comprises contacting the hydrocarbon feed and the greater boiling aromatic bottoms effluent with the FCC catalyst at a temperature of from 550° C. to 650° C.; for a contact time in the FCC reactor of from 0.1 seconds to 30 seconds; and at a feed ratio of the FCC catalyst to total hydrocarbons of from 1:1 to 40:1, where the total hydrocarbons comprises the hydrocarbon feed and the greater boiling aromatic bottoms effluent; or
the FCC reactor is a riser reactor and the process comprises contacting the hydrocarbon feed and the greater boiling aromatic bottoms effluent with the FCC catalyst at the reaction temperature of from 480° C. to 650° C., for a contact time in the FCC reactor of from 0.7 seconds to 10 seconds; and at a feed ratio of the FCC catalyst to total hydrocarbons of from 1:1 to 15:1, where the total hydrocarbons comprises the hydrocarbon feed and the greater boiling aromatic bottoms effluent.

16. A system for upgrading a hydrocarbon feed, the system comprising:
a hydrocarbon feed comprising greater than or equal to 12 weight percent hydrogen based on the total weight of the hydrocarbon feed;
an aromatic bottoms stream from an aromatics recovery complex, the aromatic bottoms stream comprising at least 50 weight percent $C_{9+}$ aromatic compounds based on the total weight of the aromatic bottoms stream;
an aromatic bottoms atmospheric distillation unit in fluid communication with the aromatic bottoms stream to pass the aromatic bottoms stream to the aromatic bottoms atmospheric distillation unit, the aromatic bottoms atmospheric distillation unit operable to separate the aromatics bottoms stream into a lesser boiling effluent and a greater boiling aromatic bottoms effluent; and
a fluidized catalytic cracking (FCC) unit downstream of the aromatic bottoms atmospheric distillation unit, the FCC unit comprising at least one FCC reactor; an FCC catalyst, FCC catalyst additive, or both circulated through the FCC unit; and at least one catalyst regenerator, where:
the at least one FCC reactor is in fluid communication with the hydrocarbon feed to pass the hydrocarbon feed to the FCC reactor;
the at least one FCC reactor is fluidly coupled to the aromatic bottoms atmospheric distillation unit such that the at least one FCC reactor receives the greater boiling aromatic bottoms effluent from the aromatic bottoms atmospheric distillation unit; and
the at least one FCC reactor operable to contact the hydrocarbon feed and the greater boiling aromatic bottoms effluent with the FCC catalyst, the FCC catalyst additive, or both at operating conditions sufficient to cause at least a portion of hydrocarbons in the hydrocarbon feed and the greater boiling aromatic bottoms effluent to undergo catalytic cracking reactions to produce an FCC effluent and a spent FCC catalyst comprising coke deposits.

17. The system of claim 16, further comprising the aromatics recovery complex operable to process a reformate from naphtha reforming to produce one or more aromatic product streams and the aromatic bottoms stream, where the aromatics recovery complex is in fluid communication with the atmospheric distillation unit to pass the aromatics bottoms stream from the aromatics recovery complex to the aromatic bottoms atmospheric distillation unit.

18. The system of claim 16, further comprising:
a greater boiling aromatic bottoms control valve disposed in a greater boiling aromatic bottoms transfer line fluidly coupling the atmospheric distillation unit to the FCC unit; and
a system controller communicatively coupled to the greater boiling aromatic bottoms control valve, the system controller comprising a processor, a memory module, and computer readable and executable instructions stored on the memory module, where the computer readable and executable instructions, when executed by the processor, automatically cause the system controller to control a position of the greater boiling aromatic bottoms control valve to control a flow rate of the greater boiling aromatic bottoms to the FCC unit.

19. The system of claim 18, where the computer readable and executable instructions, when executed by the processor, automatically cause the system controller to:
measure one or more operating parameters of the FCC unit; and
control a position of the greater boiling aromatic bottoms control valve based on the measured operating parameters of the FCC unit.

20. The system of claim 16, wherein the aromatic bottoms stream comprises at least 50 weight percent $C_{9+}$ aromatic compounds based on the total weight of the aromatic bottoms stream.

\* \* \* \* \*